United States Patent
Kim et al.

(10) Patent No.: US 12,346,624 B2
(45) Date of Patent: Jul. 1, 2025

(54) SOURCE DEVICE, SINK DEVICE, AND OPERATING METHODS THEREOF

(71) Applicant: Samsung Electronics Co., Ltd., Suwon-si (KR)

(72) Inventors: Hyeongjin Kim, Suwon-si (KR); Seungbum Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/120,913

(22) Filed: Mar. 13, 2023

(65) Prior Publication Data

US 2023/0214168 A1 Jul. 6, 2023

Related U.S. Application Data

(63) Continuation of application No. PCT/KR2022/016772, filed on Oct. 30, 2022.

(30) Foreign Application Priority Data

Dec. 30, 2021 (KR) .................. 10-2021-0192800
Feb. 15, 2022 (KR) .................. 10-2022-0019455

(51) Int. Cl.
*G06F 3/14* (2006.01)
*G06F 3/0354* (2013.01)
(Continued)

(52) U.S. Cl.
CPC ............ *G06F 3/1454* (2013.01); *H04L 47/25* (2013.01); *H04W 28/06* (2013.01); *G06F 3/03545* (2013.01); *G06F 3/0416* (2013.01)

(58) Field of Classification Search
CPC ...... H04L 47/25; H04W 28/06; G06F 3/1454; G06F 3/017; G06F 3/012; G06F 3/016;
(Continued)

(56) References Cited

U.S. PATENT DOCUMENTS 7,136,909 B2   11/2006   Balasuriya
7,769,808 B2   8/2010   Ohno et al.
(Continued)

FOREIGN PATENT DOCUMENTS

JP   2002149316 A   5/2002
JP   4998166 B2   8/2012
(Continued)

OTHER PUBLICATIONS

International Search Report issued in International Application No. PCT/KR2022/016772; Application Filing Date Oct. 30, 2022; Date of Mailing Feb. 10, 2023 (3 pages).
(Continued)

*Primary Examiner* — Yaron Cohen
(74) *Attorney, Agent, or Firm* — CANTOR COLBURN LLP

(57) ABSTRACT

A source device includes a wireless communication module, a memory, and a processor. The processor is configured to transmit screen image data, generated by the source device to be displayed on a sink device, to the sink device through the wireless communication module. The processor is also configured to determine whether a target application configured to change a transmission amount of user input data generated in a screen image that is based on the screen image data, by an input device connected to the sink device is being executed while the screen image is being displayed on the sink device. The processor is further configured to adjust a transmission bit rate of the screen image data by changing a transfer profile for transmitting the screen image data, based on a determination that the target application is being executed.

19 Claims, 14 Drawing Sheets

```
                 ┌─ 1110
┌─────────────────────────────────┐
│ USAGE_PAGE (Generic Desktop)    │
│ USAGE (X)                       │
│ REPORT_SIZE (16)                │
│ UNIT_EXPONENT (-2)              │
│ UNIT (SI Linear: Distance)      │
│ LOGICAL_MAXIMUM (32767)         │
│ PHYSICAL_MAXIMUM (1920)         │
│ INPUT (Data, Var, Abs)          │
│ USAGE_PAGE (Generic Desktop)    │
│ USAGE (Y)                       │
│ PHYSICAL_MAXIMUM (1080))        │
│ INPUT (Data, Var, Abs)          │
└─────────────────────────────────┘

┌─ 1130
┌─────────────────────────────────┐
│ USAGE_PAGE (Generic Desktop)    │
│ USAGE (X)                       │
│ REPORT_SIZE (8)                 │
│ UNIT_EXPONENT (-2)              │
│ UNIT (SI Linear: Distance)      │
│ LOGICAL_MAXIMUM (127)           │
│ PHYSICAL_MAXIMUM (1920)         │
│ INPUT (Data, Var, Abs)          │
│ USAGE_PAGE (Generic Desktop)    │
│ USAGE (Y)                       │
│ PHYSICAL_MAXIMUM (1080))        │
│ INPUT (Data, Var, Abs)          │
└─────────────────────────────────┘
```

(51) Int. Cl.
*G06F 3/041* (2006.01)
*H04L 47/25* (2022.01)
*H04W 28/06* (2009.01)

(58) Field of Classification Search
CPC .... G06F 3/013; G06F 3/0416; G06F 3/03545; G09G 2354/00; G09G 2350/00; G09G 2370/16; G09G 2340/0435; H04N 21/436; H04N 21/4363; H04N 21/43; H04N 21/81; H04N 7/01; H04N 21/462; H04N 21/4621; H04N 21/43615; H04N 21/4122
See application file for complete search history.

(56) References Cited

U.S. PATENT DOCUMENTS

| | | | |
|---|---|---|---|
| 8,547,918 | B2 | 10/2013 | Brueck et al. |
| 8,966,131 | B2 | 2/2015 | Huang et al. |
| 9,401,007 | B2 | 7/2016 | Sohn |
| 9,413,803 | B2 | 8/2016 | Huang et al. |
| 9,652,192 | B2 | 5/2017 | Bhamidipati et al. |
| 10,057,317 | B2 | 8/2018 | Jeong et al. |
| 10,108,386 | B2 | 10/2018 | Raveendran et al. |
| 11,231,898 | B2 | 1/2022 | Bae et al. |
| 2013/0003624 | A1 | 1/2013 | Huang et al. |
| 2013/0009887 | A1 | 1/2013 | Huang et al. |
| 2013/0346562 | A1 | 12/2013 | Kim |
| 2017/0026505 | A1 | 1/2017 | Yoshimura |
| 2017/0032762 | A1 | 2/2017 | Smadi et al. |
| 2017/0078740 | A1* | 3/2017 | Iwami ................ H04N 21/4316 |
| 2017/0322698 | A1 | 11/2017 | Saul et al. |

FOREIGN PATENT DOCUMENTS

| | | |
|---|---|---|
| KR | 100614995 B1 | 8/2006 |
| KR | 101496607 B1 | 2/2015 |
| KR | 101615998 B1 | 4/2016 |
| KR | 101640854 B1 | 7/2016 |
| KR | 101780300 B1 | 10/2017 |
| KR | 20170122571 A | 11/2017 |
| KR | 101914478 B1 | 11/2018 |
| KR | 20190074309 A | 6/2019 |
| KR | 102281341 B1 | 7/2021 |
| KR | 20210121777 A | 10/2021 |
| WO | 2017136961 A1 | 8/2017 |

OTHER PUBLICATIONS

Extended European Search Report Issued In EP Application No. 22916360.5-1207, Mail Date Mar. 4, 2025, 15 Pages.

Extended European Search Report Issued in EP Application No. 22916360.5-1207; Mail Date May 19, 2025; 16 Pages.

* cited by examiner

High profile

| input1 X,Y(1000, 1000) | input2 X,Y(1001, 1002) | input3 X,Y(999, 1001) | input4 X,Y(1000, 998) | input5 X,Y(1005, 995) |

810

Low profile

| input1 X,Y(1000, 1000) | ~~input2 X,Y(1001, 1002)~~ drop | ~~input3 X,Y(999, 1001)~~ drop | ~~input4 X,Y(1000, 998)~~ drop | input5 X,Y(1005, 995) |

|  | X, Y (relative values) | Conversion to HEX | Byte Align |
|---|---|---|---|
| Hight Profile | 30000, 20000 | 7530, 4E20 | 75 30 4E 20 (4Byte) |
| Mid Profile | 1920, 1080 | 780, 438 | 78 04 38 (3Byte) |
| Low Profile | 200, 100 | C8, 64 | C8, 64 (2Byte) |

FIG. 9

SOURCE DEVICE, SINK DEVICE, AND OPERATING METHODS THEREOF

CROSS-REFERENCE TO RELATED APPLICATIONS

This application is a continuation application of International Application No. PCT/KR2022/016772 designating the United States, filed on Oct. 30, 2022, in the Korean Intellectual Property Receiving Office and claiming priority to Korean Patent Application No. 10-2021-0192800, filed on Dec. 30, 2021, and Korean Patent Application No. 10-2022-0019455, filed on Feb. 15, 2022, in the Korean Intellectual Property Office, the disclosures of which are incorporated by reference herein in their entireties.

BACKGROUND

1. Field

The disclosure relates to a source device, a sink device, and operating methods thereof.

2. Description of Related Art

A human interface device (HID) for performing a user interface between a user and a device may be used by various types of user inputs, for example, a touch input, a gesture input, a mouse input, a keyboard input, and/or a pen input. A user input may be transmitted to each device through, for example, a user input back channel (UIBC). The UIBC may correspond to a function of transmitting a user input occurring in an image displayed on a display screen of a sink device to a source device so that the source device processes the user input. The UIBC may be used for user input communication from the sink device to a user interface included in the source device. Here, a device that provides an image to another electronic device may be called a "source device," and a device that receives the image may be called a "sink device."

SUMMARY

As technologies develop, the quantity and size of user input data generated in a human interface device (HID) has increased in proportion to an increase in the original size of a video image. For example, for a pen input, "300" to "400" pieces of input data may be generated per second. However, in a case in which a network throughput is poor, when UIBC data is transmitted in the same manner as in a case of a good network throughput, the quantity and size of UIBC data needing to be processed within a limited throughput may increase, which may result in a latency of a user input between devices that exchange UIBC data, thereby impairing usability. In addition, although a bit rate of user input data is significantly less than a bit rate of a video image, a latency of a user input may also occur due to a large quantity of user input data.

According to embodiments, a quantity of user input data (e.g., user input back channel (UIBC) data) generated between a source device and a sink device according to a type of applications used in the source device and/or a network environment including a network throughput may be adaptively adjusted.

According to embodiments, a sink device may adaptively adjust an amount of user input data to be transmitted, by determining a network condition.

According to embodiments, when a target application in which a large number of user inputs may occur is executed in a sink device, a source device may reduce a bit rate of a video image to be transmitted to the sink device through a communication between the source device and the sink device, and may increase an amount of user input data to be transmitted to the source device.

According to one embodiment, a source device includes a wireless communication module, a memory, and a processor. The processor is configured to transmit screen image data, generated by the source device to be displayed on a sink device, to the sink device through the wireless communication module, determine whether a target application configured to change a transmission amount of user input data generated in a screen image that is based on the screen image data, by an input device connected to the sink device is being executed while the screen image is being displayed on the sink device, and adjust a transmission bit rate of the screen image data by changing a transfer profile for transmitting the screen image data, when it is determined that the target application is being executed.

According to one embodiment, a sink device includes a wireless communication module, a display module, a memory, and a processor. The processor may be configured to receive screen image data, generated by a source device to be displayed on the sink device, through the wireless communication module, display a screen image that is based on the screen image data, using the display module, acquire user input data, generated in the screen image by an input device connected to the sink device, while the screen image is being displayed, dynamically change a parameter for adaptively adjusting a transmission amount of the user input data including at least one of a data size or a number of pieces of data to be transmitted, based on a network quality between the source device and the sink device, and transmit the dynamically changed parameter to the source device.

According to one embodiment, a method of operating a source device includes transmitting screen image data, generated by the source device to be displayed on a sink device, to the sink device, determining whether a target application configured to change a transmission amount of user input data generated in a screen image that is based on the screen image data, by an input device connected to the sink device is being executed while the screen image is being displayed on the sink device, and adjusting a transmission bit rate of the screen image data by changing a transfer profile for transmitting the screen image data, when it is determined that the target application is being executed.

According to one embodiment, a method of operating a sink device includes receiving screen image data generated by a source device to be displayed on the sink device, displaying a screen image that is based on the screen image data, acquiring user input data, generated in the screen image by an input device connected to the sink device, while the screen image is being displayed, dynamically changing a parameter for adaptively adjusting a transmission amount of the user input data including at least one of a data size or a number of pieces of data to be transmitted, based on a network quality between the source device and the sink device, and transmitting the dynamically changed parameter to the source device.

According to one embodiment, a sink device may determine a network quality and adaptively increase or reduce a transmission amount of user input data, thereby improving usability of an input device (e.g., an HID) connected to the sink device.

According to one embodiment, it is possible to enhance a quality of user input data by adaptively adjusting a transmission amount of data exchanged between a source device and a sink device through a communication between the source device and the sink device.

According to one embodiment, it is possible to reduce a latency of a user input and improve usability by adaptively adjusting an amount of user input data to be generated and/or an amount of user input data to be transmitted, based on a network condition.

According to one embodiment, it is possible to reduce a latency of a user input and improve usability by adjusting a bit rate of data (e.g., screen image data) transmitted by a source device according to a type of applications being executed in a sink device.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a diagram illustrating a method by which a sink device limits a number of pieces of user input data to be transmitted according to one embodiment;

FIG. 9 is a diagram illustrating an example of an input report according to one embodiment;

DETAILED DESCRIPTION

Figure 1:
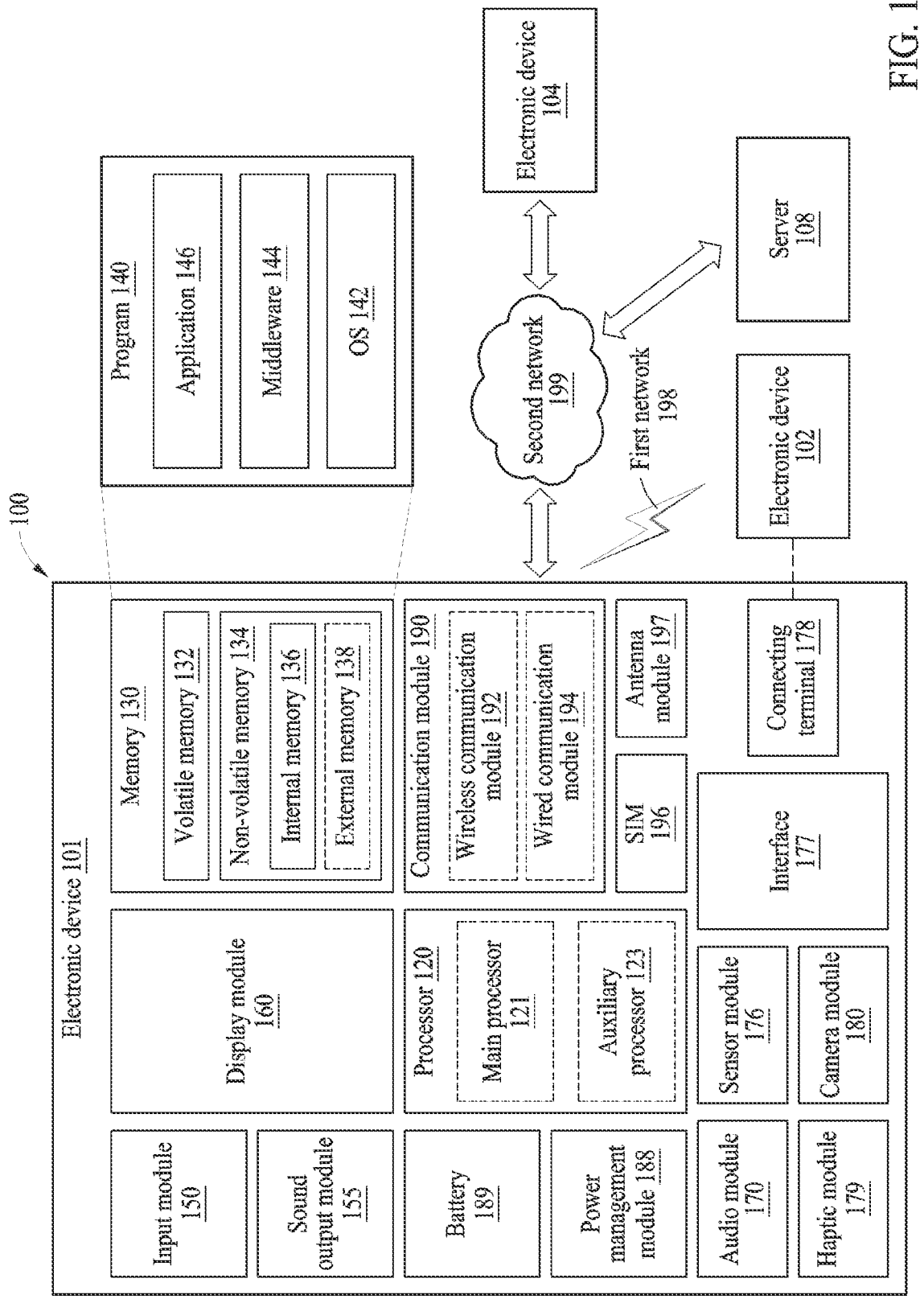
FIG. 1 is a block diagram illustrating an electronic device in a network environment according to one embodiment.

Hereinafter, embodiments will be described in detail with reference to the accompanying drawings. When describing the embodiments with reference to the accompanying drawings, like reference numerals refer to like elements and any repeated description related thereto will be omitted.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123.

According to one embodiment, the auxiliary processor 123 (e.g., an NPU) may include a hardware structure specified for processing of an artificial intelligence (AI) model. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store a variety of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to detect a touch, or a pressure sensor adapted to measure the intensity of force incurred by the touch.

The audio module 170 may convert a sound into an electric signal or vice versa. According to one embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a fingerprint sensor.

The interface 177 may support one or more specified protocols to be used for the electronic device 101 to be coupled with the external electronic device (e.g., the electronic device 102) directly (e.g., wiredly) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image pixels, image signal processors, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to embodiments, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
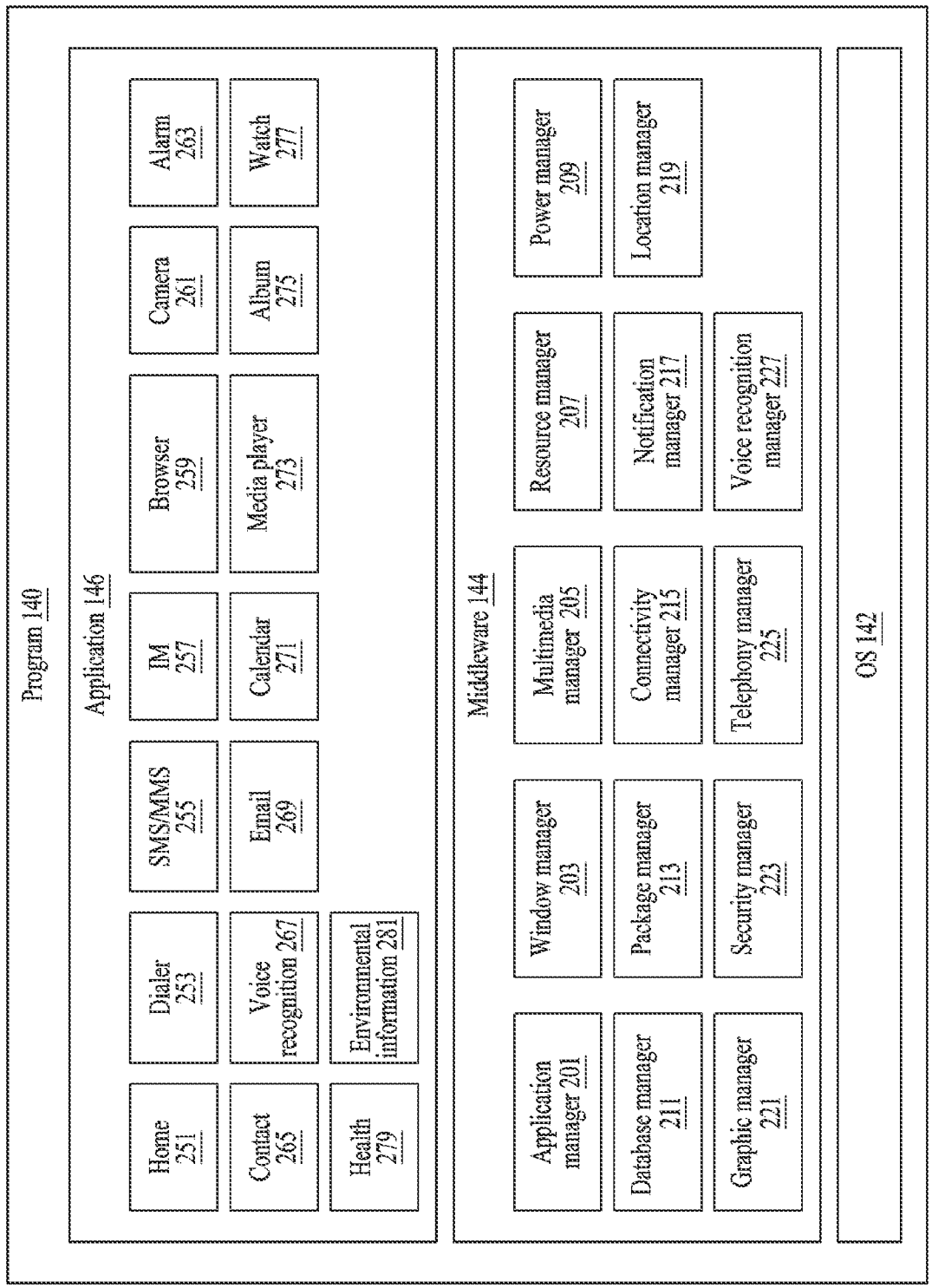
FIG. 2 is a block diagram illustrating a program according to one embodiment.

FIG. 2 is a block diagram 200 illustrating a program 140 according to one embodiment. According to one embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database (DB) manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based at least in part on corresponding information of the capacity, temperature, or power of the battery 189. According to one embodiment, the power manager 209 may interwork with a basic input/output system (BIOS) (not shown) of the electronic device 101.

The DB manager 211, for example, may generate, search, or change a DB to be used by the application 146. The package manager 213, for example, may manage installation or update of an application that is distributed in the form of a package file. The connectivity manager 215, for example, may manage a wireless connection or a direct connection between the electronic device 101 and an external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based at least in part on the voice data. According to one embodiment, the middleware 144 may dynamically delete some existing components or add new components. According to one embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to one embodiment, the application 146 may further include an information exchanging application (not shown) that is capable of supporting information exchange between the electronic device 101 and an external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101, or some component (e.g., a display module or a camera module of the external electronic device) of the external electronic device. The device management application may additionally or alternatively support the installation, deletion, or update of an application being operated on an external electronic device.

The electronic devices according to embodiments may be various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
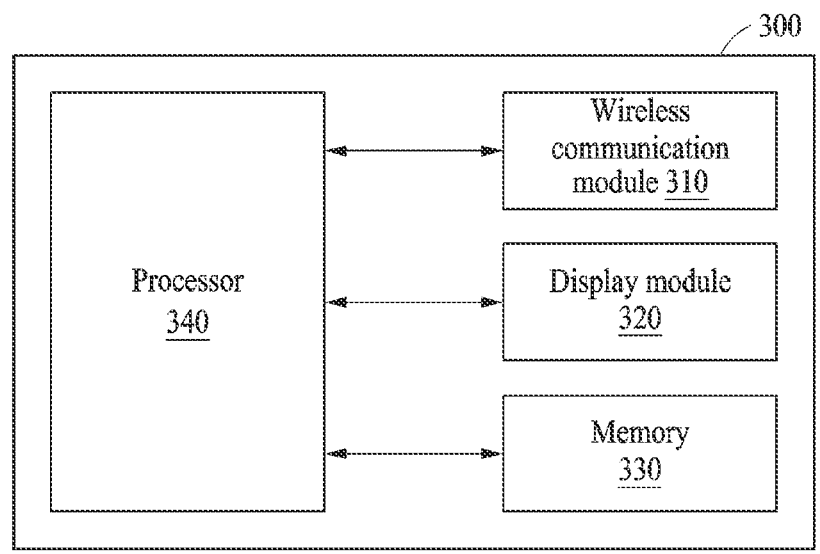
FIG. 3 is a block diagram illustrating a source device according to one embodiment.

FIG. 3 is a block diagram illustrating a source device according to one embodiment. Hereinafter, in embodiments of the present disclosure, a source device 300 (e.g., the electronic devices 101 and 102 of FIG. 1, a source device 510 of FIG. 5, a source device 1001 of FIG. 10, a source device 1501 of FIG. 15, and/or a user terminal 1601 of FIG. 16) is configured to transmit screen image data to a sink device (e.g., the electronic devices 101 and 102 of FIG. 1, a sink device 400 of FIG. 4, a sink device 530 of FIG. 5, a sink device 1003 of FIG. 10, and a sink device 1503 of FIG. 15, and/or a smart glasses 1603 of FIG. 16). The screen image data may include, for example, at least one of an image frame generated by duplicating a screen (e.g., a screen 515 of FIG. 5) displayed by a display module 320 of the source device 300, and/or an image frame related to the screen 515 displayed by the display module 320 of the source device 300.

For example, the source device 300 may transmit the screen 515 that is actually displayed on the source device 300 to the sink device 400 without a change, or may transmit a combination of at least a portion of image frames displayed on an output (e.g., the screen 515) displayed on the source device 300 to the sink device 400. In another example, the source device 300 may transmit new image frames that are not output from the source device 300 to the sink device 400. Image frames may be included in a data packet of a designated format and transmitted. Hereinafter, for convenience of description, an "image frame related to the screen 515" may be briefly expressed as "screen image data." The screen image data may be multimedia data including audio data in addition to image data.

The source device 300 and the sink device 400 may be located adjacent to each other and may be connected to, for example, the same wireless fidelity (Wi-Fi) network, however, the embodiments are not limited thereto. For example, the source device 300 and the sink device 400 may be connected through a Bluetooth communication. The source device 300 may be, for example, an electronic device capable of supporting Miracast™ for wirelessly sharing multimedia data including high-resolution photographs and high-definition video content between Wi-Fi devices. The source device 300 may transmit screen image data generated by transcoding a screen (e.g., the screen 515 of FIG. 5) displayed on a display of the source device 300 to the sink device 400 through a wireless communication such as Wi-Fi. The screen image data generated by the source device 300 and transmitted to the sink device 400 may correspond to an image frame different from an image frame output from the source device 300 despite the same content as that of the screen 515 output from the display module 320 included in the source device 300, because the screen image data is transmitted by copying and/or editing the image frame output from the source device 300.

In addition, the screen image data transmitted to the sink device 400 may have the same resolution and the same aspect ratio as those of the screen 515 output from the display module 320 of the source device 300, or may have a resolution and/or aspect ratio different from those of the screen 515 output from the display module 320 of the source device 300.

Here, a video format and/or an audio format of the screen image data transmitted to the sink device 400 may be determined according to codec settings between the source device 300 and the sink device 400. The source device 300 may receive and process user input data such as a touch input and a key input from the sink device 400 through, for example, a user input back channel (UIBC). The UIBC may be used by the source device 300 to process user input data when user input data by a user input (e.g., a user input 535 of FIG. 5) occurring on a screen image 537 that is based on screen image data by an input device connected to the sink device 400 while the screen image 537 is being displayed on a display screen of the sink device 400, is transmitted to the source device 300.

Referring to FIG. 3, the source device 300 includes a wireless communication module 310 (e.g., the wireless communication module 192 of FIG. 1), the display module 320 (e.g., the display module 160 of FIG. 1), a memory 330 (e.g., the memory 130 of FIG. 1), and a processor 340 (e.g., the processor 120 of FIG. 1).

The wireless communication module 310 may perform a wireless communication with the sink device 400, and may transmit, to the sink device 400, a plurality of image frames, for example, screen image data, related to a screen (e.g., the screen 515 of FIG. 5) of the source device 300 generated by the source device 300 to be displayed on the sink device 400. In addition, the wireless communication module 310 may receive user input data transmitted from the sink device 400 to the source device 300 through the UIBC.

The UIBC may have a reverse channel structure that is also referred to as a user interface back channel, and may be configured to allow the sink device 400 to transmit user input data corresponding to user inputs occurring in an input device (e.g., an input device 531 of FIG. 5) connected to the sink device 400 to the source device 300. The reverse channel structure may also allow user interface functions and upper layer messages for transmitting user inputs to reside in an Internet protocol (IP) transmission layer between the sink device 400 and the source device 300. To promote reliable transmission and sequential transfer of data packets including user input data, the UIBC may also be configured to be executed on a packet-based communication protocol, for example, a transmission control protocol/Internet protocol (TCP/IP) or a user datagram protocol (UDP). In addition, the UIBC may also be configured to transmit various types of user input data including cross-platform or multi-platform user input data that may operate in various types of computer platforms. For example, the source device 300 may execute iOS®, and the sink device 400 may execute another OS such as Android® or Windows®. A plurality of different types of user input formats may allow a plurality of different types of source device 300 and sink devices 400 to utilize a protocol via the UIBC. For example, as a user input format, a generic input format may be used, or a platform specific input format (e.g., an HID format) may be used. In one embodiment, by transmitting and receiving user input data between the source device 300 and the sink device 400 via the UIBC, a flexibility for a platform and/or an OS used by each device may be provided.

For example, user input data may be generated in the screen image 537 by an input event by an input device connected to (or included in) the sink device 400 while screen image data generated by the source device 300 and transmitted to the sink device 400 is being displayed using a display module (e.g., a display module 420 of FIG. 4) of the sink device 400.

The input device may include, for example, all input devices that may be connected to the sink device 400 via a wire and/or wirelessly and that may transmit a user's operation. The input device may include, for example, a mouse, a keyboard, a touch screen, a pen, a microphone, and a wearable device, but is not limited thereto. An input event may include, for example, a mouse click, a key input of a keyboard, a touch input to a touch screen, a pen input, a voice input, a gesture input, and a gaze movement input, but is not limited thereto.

The display module 320 may display a screen (e.g., the screen 515 of FIG. 5) generated by the source device 300.

The memory 330 may store computer-executable instructions. The memory 330 may also store a variety of information generated in a processing process of the processor 340. In addition, the memory 330 may store a variety of data and programs. The memory 330 may include, for example, a volatile memory or a non-volatile memory. The memory 330 may include a high-capacity storage medium such as a hard disk to store a variety of data.

The processor 340 may execute the instructions by accessing the memory 330. The processor 340 may transmit screen image data, generated by the source device 300 to be displayed on the sink device 400, to the sink device 400 through the wireless communication module 310.

The screen image data generated by the source device 300 may include, for example, an image frame obtained by duplicating the screen 515 displayed on the display module 320 of the source device 300, and/or an image frame related to the screen 515 displayed on the display module 320 of the source device 300, but is not limited thereto.

Here, the image frame related to the screen 515 displayed on the display module 320 of the source device 300 may include the same content as that of the screen 515 displayed on the display module 320. The image frame related to the screen 515 may include, for example, image frames different in a size, a resolution, and an aspect ratio, and an image frame generated by transcoding the screen 515 displayed on the display module 320 into a video format and/or audio format determined according to codec settings between the source device 300 and the sink device 400.

The processor 340 may determine whether a target application configured to change a transmission amount of user input data generated in the screen image 537 that is based on the screen image data by the input device connected to the sink device 400 is being executed, while the screen image 537 is being displayed on the sink device 400. Here, the target application may correspond to an application configured to change a transmission amount of user input data by the input device connected to the sink device 400 when a corresponding application is executed, because a large amount of user input data is generated or user input data is frequently generated in comparison to other applications. The target application may include, for example, an application for providing a predetermined service, such as a handwriting application, a photo editing application, and/or a drawing application, in which at least one of a pen input event or a touch input event occurs, but is not limited thereto. The target application may also include a user experience (UX) of a basic framework for displaying a menu, in addition to the app for providing a predetermined service.

For example, when it is determined that the target application is being executed in the screen image 537 that is based on the screen image data displayed on the sink device 400, the processor 340 may adjust a transmission bit rate of the screen image data by changing a transfer profile for transmitting the screen image data. If it is determined that the target application is being executed in the screen image 537, the processor 340 may lower a transmission bit rate of the screen image data transmitted to the sink device 400 and request the sink device 400 to increase the transmission amount of the user input data based on the transfer profile. If it is determined that the target application is not executed in the screen image 537, the processor 340 may increase the transmission bit rate of the screen image data transmitted to the sink device 400 and request the sink device 400 to lower the transmission amount of the user input data based on the transfer profile.

Also, when it is determined that the target application is being executed in the screen image 537 displayed on the sink device 400, the processor 340 may transmit a message including a transfer profile related to the user input data to the sink device 400. A transfer profile may define a communication scheme for a data transmission between the sink and source devices. The transfer profile may include, for example, at least one of a type, a structure, or a use method of a protocol used for a transmission of corresponding data, but is not limited thereto.

The message transmitted from the source device 300 to the sink device 400 may be, for example, a real time streaming protocol (RTSP) message. The RTSP message may be a network control protocol for controlling a streaming media server and may operate in an application layer of an Internet protocol. The RTSP message may include information on an information transmission scheme of voice or video transmitted in real time, such as a transfer profile. The RTSP message may include a parameter such as "wfd_UIBC_first=on."

Various examples of an operation performed between the source device 300 and the sink device 400 when user input data is generated by the input device connected to the sink device 400 will be described in more detail with reference to FIG. 5 below.

Figure 16:
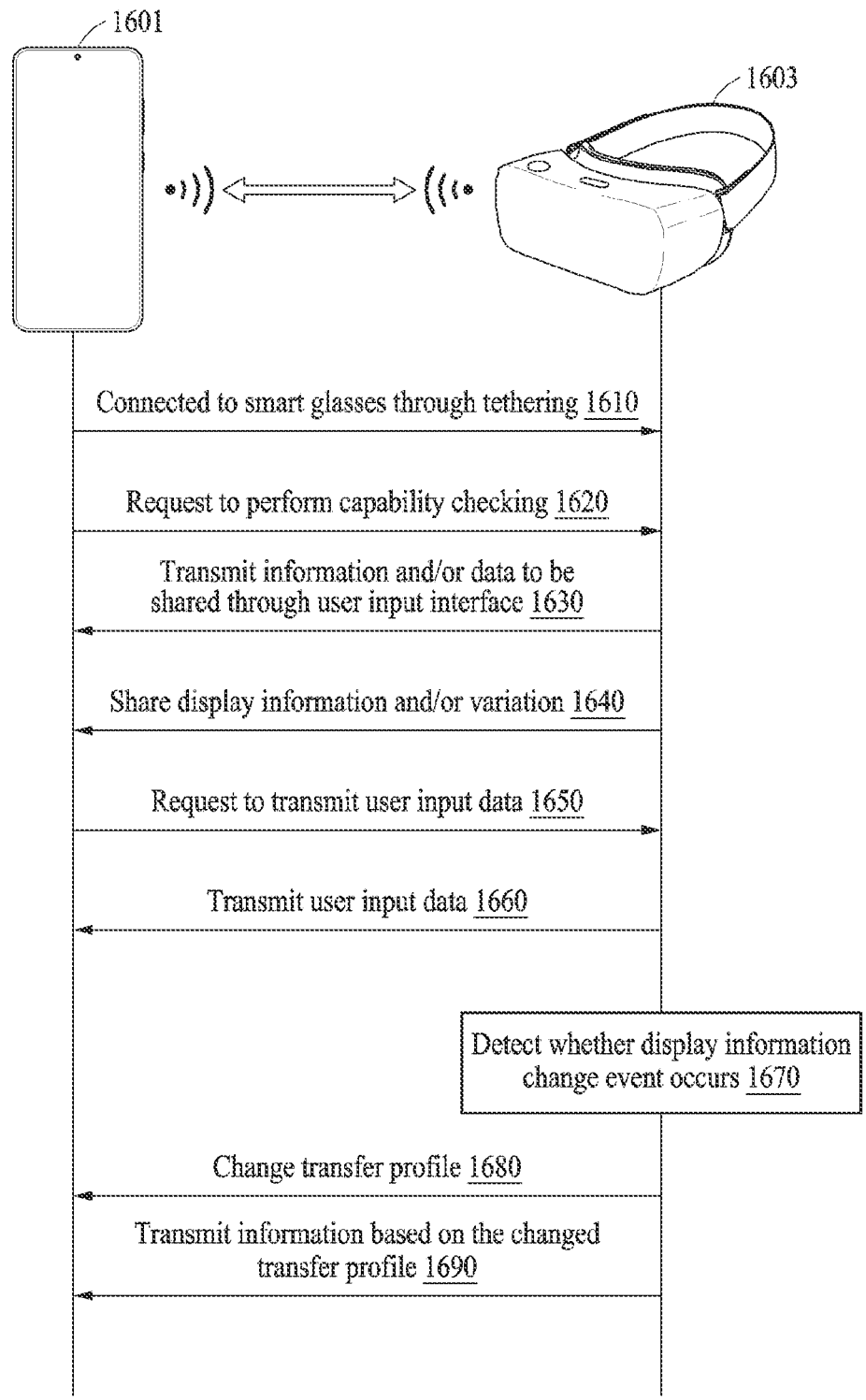
FIG. 16 is a diagram illustrating a process of transmitting user input data when a source device is a user terminal and a sink device is smart glasses, according to one embodiment.

According to one embodiment, the sink device 400 may be, for example, a wearable device (e.g., smart glasses 1603 of FIG. 16) as shown in FIG. 16 below. If the sink device 400 is the smart glasses 1603, the processor 340 may receive display information including at least one of a number of screen images to be displayed on the smart glasses 1603, a size of each of the screen images, a resolution of each of the screen images, or a bit rate of each of the screen images, through the wireless communication module 310. The processor 340 may request the smart glasses 1603 to transmit information through a user input interface for sharing additional information, based on the display information. The user input interface will be described below with reference to FIG. 16. The additional information may be information additionally used to process information that is not defined by a general UIBC protocol. The additional information may include, for example, information additionally used to process at least one of eye (iris), head, and hand tracking information, or image information and/or depth information for gesture recognition, object recognition and tracking, but is not limited thereto.

However, the operation of the processor 340 is not limited to the above description. For example, the processor 340 may also perform the above-described operation together with at least one of operations that will be described below with reference to FIGS. 5 to 16.

Figure 4:
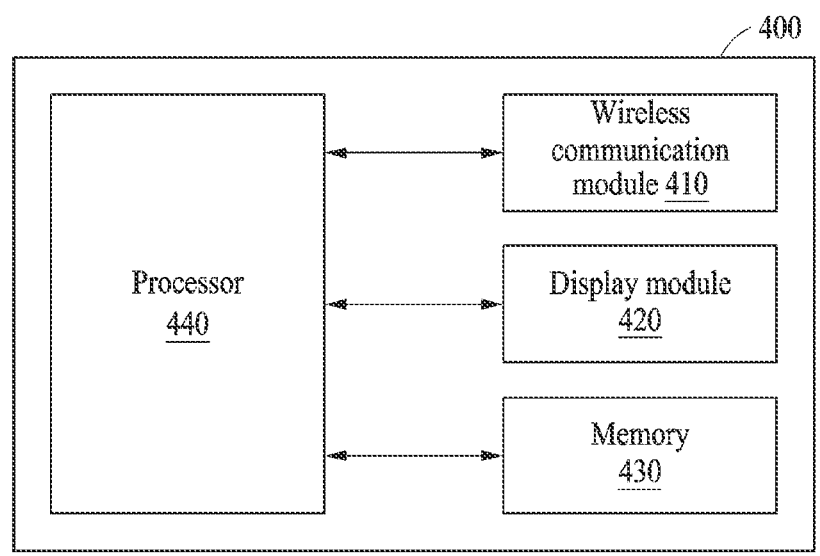
FIG. 4 is a block diagram illustrating a sink device according to one embodiment.

FIG. 4 is a block diagram illustrating a sink device according to one embodiment. Hereinafter, in embodiments of the present disclosure, the sink device 400 (e.g., the electronic devices 101 and 102 of FIG. 1, the sink device 530 of FIG. 5, the sink device 1003 of FIG. 10, the sink device 1503 of FIG. 15, and/or the smart glasses 1603 of FIG. 16) may correspond to a device configured to establish a communication with a source device (e.g., the electronic devices 101 and 102 of FIG. 1, the source device 300 of FIG. 3, the source device 510 of FIG. 5, the source device 1001 of FIG. 10, the source device 1501 of FIG. 15, and/or the user terminal 1601 of FIG. 16) and to display a screen image (e.g., the screen image 537 of FIG. 5) that is based on screen image data transmitted by the source device 300. The sink device 400 may be, for example, an electronic device such as a personal computer (PC), a smartphone, a laptop, or a tablet, or may correspond to a wearable electronic device such as the smart glasses 1603, but is not limited thereto.

Referring to FIG. 4, the sink device 400 according to one embodiment may include a wireless communication module 410 (e.g., the wireless communication module 192 of FIG. 1), a display module 420 (e.g., the display module 160 of FIG. 1), a memory 430 (e.g., the memory 130 of FIG. 1), and a processor 440 (e.g., the processor 120 of FIG. 1).

The wireless communication module 410 may receive screen image data generated by the source device 300 to be displayed on the sink device 400.

The display module 420 may display the screen image data received through the wireless communication module 410.

The memory 430 may store computer-executable instructions. The memory 430 may also store a variety of information generated in a processing process of the processor 440. In addition, the memory 430 may store a variety of data and programs. The memory 430 may include, for example, a volatile memory or a non-volatile memory. The memory 430 may include a high-capacity storage medium such as a hard disk to store a variety of data.

The processor 440 may execute the instructions by accessing the memory 430. The processor 440 may receive the screen image data, transmitted by the source device 300 to be displayed on the sink device 400, from the source device 300 through the wireless communication module 410. The processor 440 may display the screen image 537 that is based on the screen image data, using the display module 420. The screen image data may include, for example, an image frame generated by duplicating a screen (e.g., the screen 515 of FIG. 5) displayed by the display module 320 of the source device 300, and/or an image frame related to the screen 515 displayed by the module 320 of the source device 300, but is not limited thereto.

The processor 440 may acquire user input data, generated in the screen image 537 by an input device (e.g., the input device 531 of FIG. 5) connected to the sink device 400, while the screen image 537 is being displayed through the display module 420.

The processor 440 may dynamically adjust a parameter for adaptively adjusting a transmission amount of user input data including at least one of a data size and a number of pieces of data to be transmitted, based on a network quality between the source device 300 and the sink device 400. Here, the parameter for adaptively adjusting the transmission amount of the user input data may include, for example, a size of user input data and a number of pieces of user input data, in addition to an input report and/or a parameter a report descriptor of user input data that will be described below with reference to FIGS. 9 and 10.

The processor 440 may determine a transfer profile for a UIBC transmission of user input data according to a current network condition including a network throughput (TP). The processor 440 may measure, for example, the network quality between the source device 300 and the sink device 400. For example, the processor 440 may determine the network quality between the source device 300 and the sink device 400, based on at least one of a TCP window size or a round trip time (RTT) between the source device 300 and the sink device 400, but the embodiments are not limited thereto.

The processor 440 may determine one of a plurality of transfer profiles (e.g., transfer profiles 610, 630, and 650 of FIG. 6) used for a transmission of user input data, based on the measured network quality.

The plurality of transfer profiles 610, 630, and 650 may include, for example, at least two of a first transfer profile 610 corresponding to a first network quality, a second transfer profile 630 corresponding to a second network quality less than the first network quality, and a third transfer profile 650 corresponding to a third network quality less than the second network quality, but is not necessarily limited thereto. A relationship between the transfer profiles 610, 630, and 650 will be described in more detail with reference to FIG. 6 below.

Each of the transfer profiles 610, 630, and 650 may include a transmission amount for each of the transfer profiles 610, 630, and 650. The transmission amount for each of the transfer profiles 610, 630, and 650 may include, for example, at least one of a maximum size or a maximum number of pieces of user input data that may be transmitted at once for each of the transfer profiles 610, 630, and 650, but is not limited thereto. The transmission amount and data size for each of the plurality of transfer profiles 610, 630, and 650 will be described in more detail with reference to FIG. 7 below.

The processor 440 may adaptively adjust the parameter based on the determined transfer profile. The processor 440 may adjust the number of pieces of user input data to be transmitted, based on the transfer profile, for example, for each type of user input data. A method by which the processor 440 adjusts the number of pieces of user input data to be transmitted will be described in more detail with reference to FIG. 8 below.

The user input data may include, for example, at least one of an input report (e.g., an input report 900 of FIG. 9) indicating content of user input data or a report descriptor (e.g., report descriptors 1110 and 1130 of FIG. 11, and/or report descriptors 1210 and 1230 of FIG. 12) that is transmitted prior to a transmission of an input report and that indicates a composition of an input report used to interpret a value of the input report. If the transfer profile is changed in response to a change in the network quality, the processor 440 may adjust a data size of the user input data included in the report descriptor 1110, based on at least one of the changed transfer profile or a type of user input data. A method of exchanging user input data between the source device 300 and the sink device 400 according to one embodiment and an example of an input report will be described in more detail with reference to FIGS. 9 and 10 below.

A method by which the processor 440 adaptively adjusts a parameter based on a transfer profile will be described in more detail with reference to FIGS. 11 and 12 below.

The processor 440 may transmit the dynamically changed parameter to the source device 300.

According to one embodiment, when the sink device 400 is smart glasses (e.g., the smart glasses 1603 of FIG. 16), the processor 440 may share display information including at least one of a number of screen images displayed on the smart glasses 1603, a size of each of the screen images, a resolution of each of the screen images, or a bit rate of each of the screen images, with the source device 300. The processor 440 may receive a request to information transmission from the source device 300 through a user input interface for sharing additional information.

However, an operation of the processor 440 is not limited to the above-described operations, and the processor 440 may also perform at least one of operations that will be described below with reference to FIGS. 5 through 16 together with the above-described operation.

Figure 5:
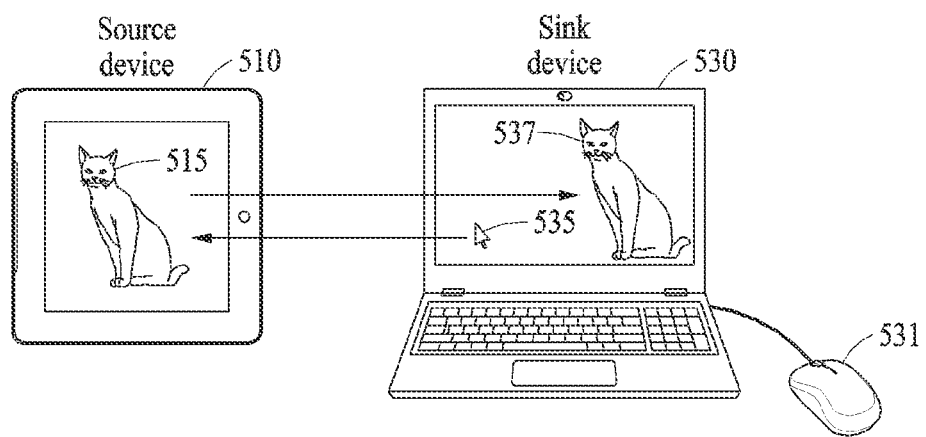
FIG. 5 is a diagram illustrating an operation performed between a source device and a sink device according to one embodiment.

FIG. 5 is a diagram illustrating an operation performed between a source device and a sink device according to one embodiment. FIG. 5 illustrates a situation in which a source device 510 (e.g., the electronic devices 101 and 102 of FIG. 1, the source device 1001 of FIG. 10, the source device 1501 of FIG. 15, and/or the user terminal 1601 of FIG. 16) according to one embodiment, and a sink device 530 (e.g., the electronic devices 101 and 102 of FIG. 1, the sink device 400 of FIG. 4, the sink device 1003 of FIG. 10, the sink device 1503 of FIG. 15, and/or the smart glasses 1603 of FIG. 16) exchange data through a communication channel.

The communication channel may generally represent an arbitrary communication medium or a collection of different communication media, for transmitting video data from the source device 510 to the sink device 530. The communication channel may correspond to a relatively short-range communication channel, for example, wireless fidelity (Wi-Fi) and Bluetooth, or may include any wireless or wired communication medium, such as a radio frequency (RF) spectrum or one or more physical transmission lines, or any combination of wireless and wired media. Depending on embodiments, the communication channel may form a portion of a packet-based network, for example, a local area network, a wide-area network, or a global network such as the Internet. The communication channel may include the above-described UIBC.

As described above, the source device 510 may transmit screen image data including audio data and/or video data including image frames related to the screen 515 to the sink device 530. The source device 510 may use a general communication channel to transmit the screen image data to the sink device 530.

The sink device 530 may display the screen image 537 by decoding and/or rendering data (e.g., screen image data) received from the source device 510. In addition, the sink device 530 may acquire user input data corresponding to the user input 535 generated by the input device 531 (e.g., a mouse) connected to the sink device 530. The input device 531 may include, for example, a keyboard, a track ball, a track pad, a touch screen, a voice recognition module, a gesture recognition module, an iris recognition module, a mouth shape recognition module, and/or various types of human interface devices (HIDs), in addition to a mouse shown in FIG. 5, but is not limited thereto.

The sink device 530 may format user input data corresponding to the user input 535, such as a movement of a cursor by the input device 531, into a data packet structure that may be interpreted by the source device 510, and may transmit the formatted user input data to the source device 510 through the above-described UIBC.

The source device 510 may respond to the user input 535 generated by the input device 531 connected to the sink device 530, while the screen image 537 displayed on the sink device 530 is being displayed using a display based on the screen image data generated and transmitted by the source device 510. Through the above interaction, the user input data corresponding to the user input 535, such as a movement of a cursor in the sink device 530, may be retransmitted to the source device 510 through the UIBC.

Figure 6:
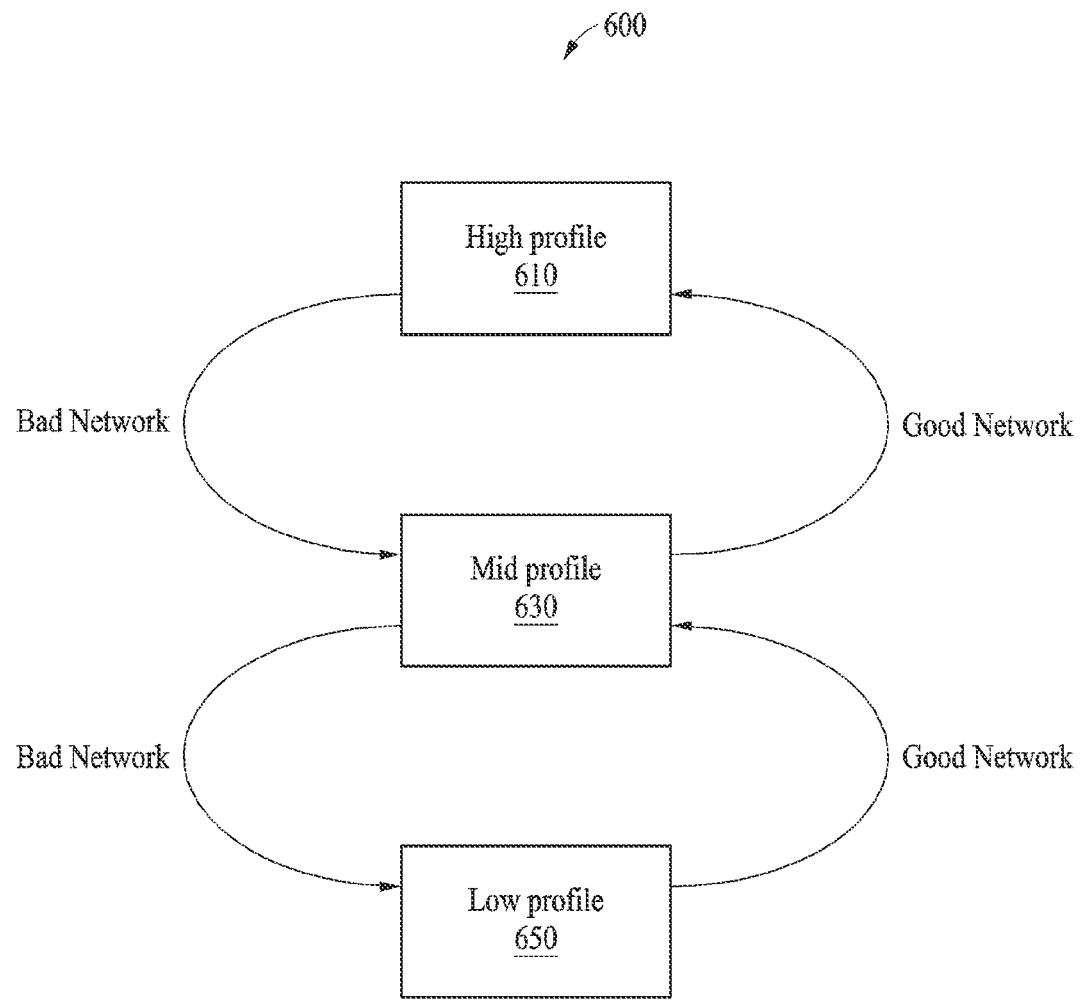
FIG. 6 is a block diagram illustrating a state diagram of a transfer profile according to one embodiment.

FIG. 6 is a block diagram illustrating a state diagram of a transfer profile according to one embodiment. FIG. 6 illustrates a diagram 600 of types of transfer profiles (e.g., the first transfer profile 610, the second transfer profile 630, and the third transfer profile 650) changed based on a network quality according to one embodiment.

In one embodiment, according to a network condition including a network quality, or a type of an application being used in a source device (e.g., the electronic devices 101 and 102 of FIG. 1, the source device 300 of FIG. 3, the source device 510 of FIG. 5, the source device 1001 of FIG. 10, the source device 1501 of FIG. 15, and/or the user terminal 1601 of FIG. 16), a sink device (e.g., the electronic devices 101 and 102 of FIG. 1, the sink device 400 of FIG. 4, the sink device 530 of FIG. 5, the sink device 1003 of FIG. 10, and the sink device 1503 of FIG. 15, and/or the smart glasses 1603 in FIG. 16) may increase or reduce a transmission amount of user input data to be transmitted to the source device 300, to reduce a latency for a user input (e.g., the user input 535 of FIG. 5) occurring between the source device 300 and the sink device 400 and provide improved usability.

The sink device 400 may determine the network condition and adjust the transmission amount of user input data to be transmitted to the source device 300. For example, the sink device 400 may determine the network condition by measuring the network quality, or determining the network quality based at least a portion of information received from another device (e.g., the source device 300 or an access point (AP)).

The sink device 400 may use, for example, a round trip time (RTT) on a TCP/IP, and/or a TCP window size, to determine the network quality between the source device 300 and the sink device 400. The sink device 400 may define a transfer profile for a transmission of user input data based on the network quality and may flexibly select a transfer profile suitable for a current network condition.

The first transfer profile 610 may correspond to a first network quality indicating a good network quality. The first transfer profile 610 may also be expressed as a "high profile" due to a large transmission amount.

The second transfer profile 630 may correspond to a second network quality that indicates a normal (or middle) network quality and that is less than the first network quality. The second transfer profile 630 may also be expressed as a "mid profile" due to a middle transmission amount.

The third transfer profile 650 may correspond to a third network quality that indicates a poor network quality and that is less than the second network quality. The third transfer profile 650 may also be expressed as a "low profile" due to a small transmission amount.

In one embodiment, a number of profiles is not limited, and a plurality of other profiles may be further included.

Each of the first transfer profile 610, the second transfer profile 630, and the third transfer profile 650 may include a transmission amount for each transfer profile. The transmission amount for each transfer profile may include, for example, a bit rate, a maximum size and/or a maximum number of pieces of user input data to be transmitted at once for each transfer profile, but is not limited thereto.

The sink device 400 may flexibly select a transfer profile suitable for the current network condition. In an example, when it is determined that the network quality is reduced at a current time at which user input data is to be transmitted even though previous user input data is transmitted based on the first transfer profile 610, the sink device 400 may change the first transfer profile 610 to the second transfer profile 630 and transmit the user input data. In another example, when it is determined that the network quality increases at a time at which current user input data is to be transmitted even though previous user input data is transmitted based on the third transfer profile 650, the sink device 400 may change the third transfer profile 650 to the second transfer profile 630 and transmit the user input data.

The sink device 400 may transmit the user input data to the source device 300 by adjusting a size and/or a number of pieces of user input data to be transmitted, according to a type of a selected transfer profile. An example in which the sink device 400 adjusts the size and/or the number of pieces of user input data to be transmitted will be described in more detail with reference to FIGS. 7 and 8 below.

Alternatively, the source device 300 may reduce a bit rate of screen image data transmitted to the sink device 400 through a communication between the source device 300 and the sink device 400, and the sink device 400 may increase a transmission amount including a bit rate of user input data to be transmitted to the source device 300, and accordingly a quality of a user input may be enhanced.

Figure 7:
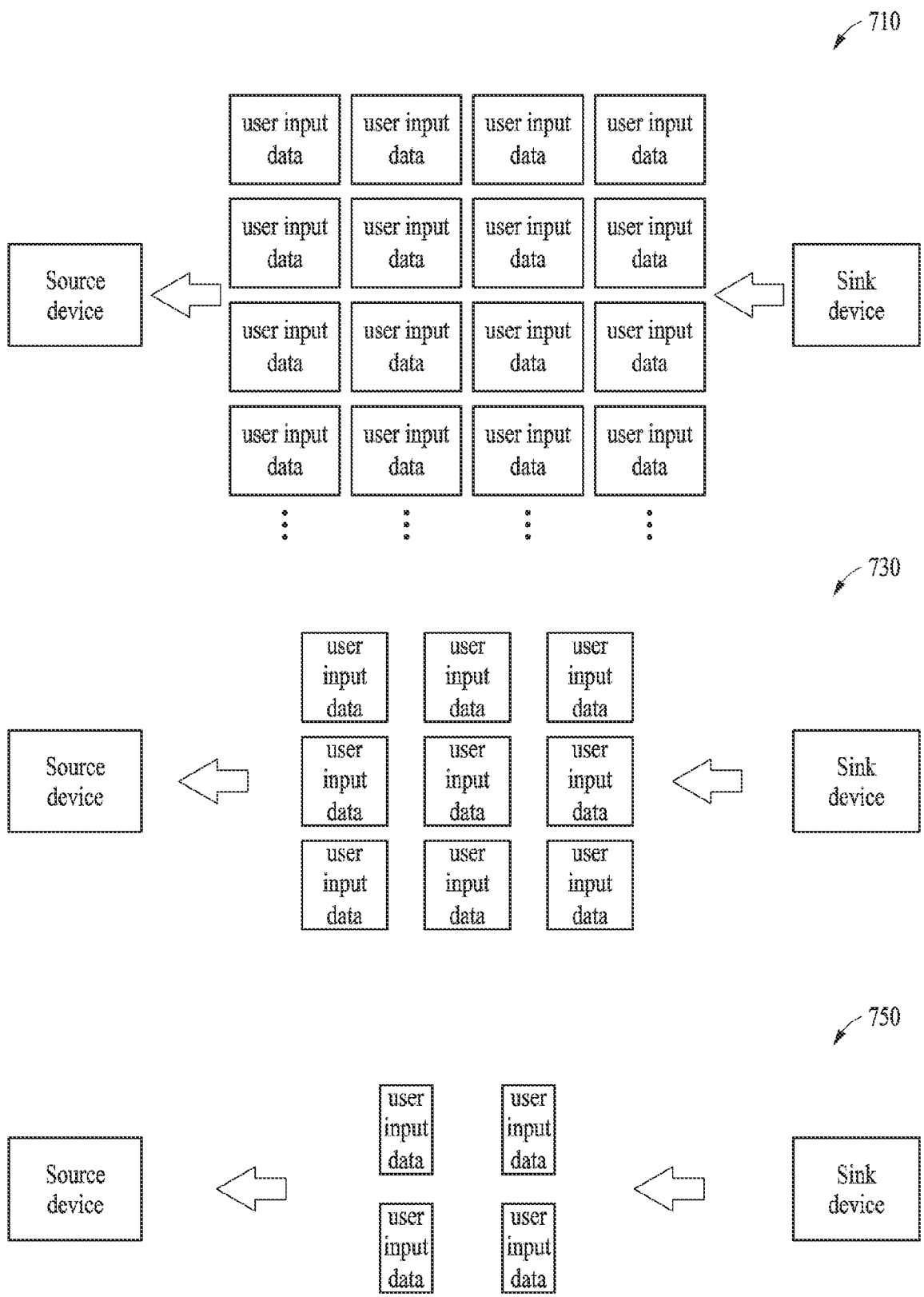
FIG. 7 is a diagram illustrating transmission amounts and data size for each of a plurality of transfer profiles according to one embodiment.

FIG. 7 is a diagram illustrating transmission amounts and data size for each of a plurality of transfer profiles according to one embodiment. FIG. 7 illustrates a diagram 710 showing a transmission amount and a size of user input data when a transfer profile is a first transfer profile, a diagram 730 showing a transmission amount and a size of user input data when the transfer profile is a second transfer profile, and a diagram 750 showing a transmission amount and a size of user input data when the transfer profile is a third transfer profile.

For example, a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16) may determine a network condition, select a transfer profile based on a current network condition, and increase or reduce an amount of user input data to be transmitted, as described above with reference to FIG. 6.

The sink device 400 may define at least some of a maximum size and/or a maximum number of pieces of user input data to be transmitted based on each transfer profile.

For example, the sink device 400 may define the first transfer profile to have a first transmission amount in which the maximum size and the maximum number of pieces of the user input data are unlimited, as shown in the diagram 710. The sink device 400 may define the second transfer profile to have a second transmission amount less than the first transmission amount as shown in the diagram 730 by limiting a number of pieces of user input data to be transmitted. The second transmission amount may have, for example, 50% of the first transmission amount, which is a maximum transmission amount of a corresponding network, but is not limited thereto. The sink device 400 may define a third transfer profile to have a third transmission amount corresponding to a size of user input data and a number of pieces of user input data that are less than those of the second transmission amount, as shown in the diagram 750, by limiting a number of pieces of user input data to be transmitted. The third transmission amount may correspond to a minimum transmission amount of the corresponding network, but is not limited thereto.

The sink device 400 may limit the number of pieces of the user input data to be transmitted by, for example, downscaling or dropping the user input data. A method by which the sink device 400 limits the number of pieces of the user input data to be transmitted will be described in more detail with reference to FIG. 8 below.

FIG. 8 is a diagram illustrating a method by which a sink device limits a number of pieces of user input data to be transmitted according to one embodiment. FIG. 8 illustrates a diagram 810 showing a number of pieces of user input data to be transmitted when a transfer profile according to one embodiment is a first transfer profile (e.g., the first transfer profile 610 of FIG. 6), and a diagram 830 showing a number of pieces of user input data to be transmitted when the first transfer profile is changed to a third transfer profile (e.g., the third transfer profile 650 of FIG. 6).

For example, as shown in the diagram 810, five pieces of user input data, for example, input1, input2, input3, input4, and input5, in response to X and Y coordinates by a touch input and/or a mouse input, or a handwriting pressure (i.e., a pen pressure) by a pen input may be generated at a current time in a screen image (e.g., the screen image 537 of FIG.

Figure 10:
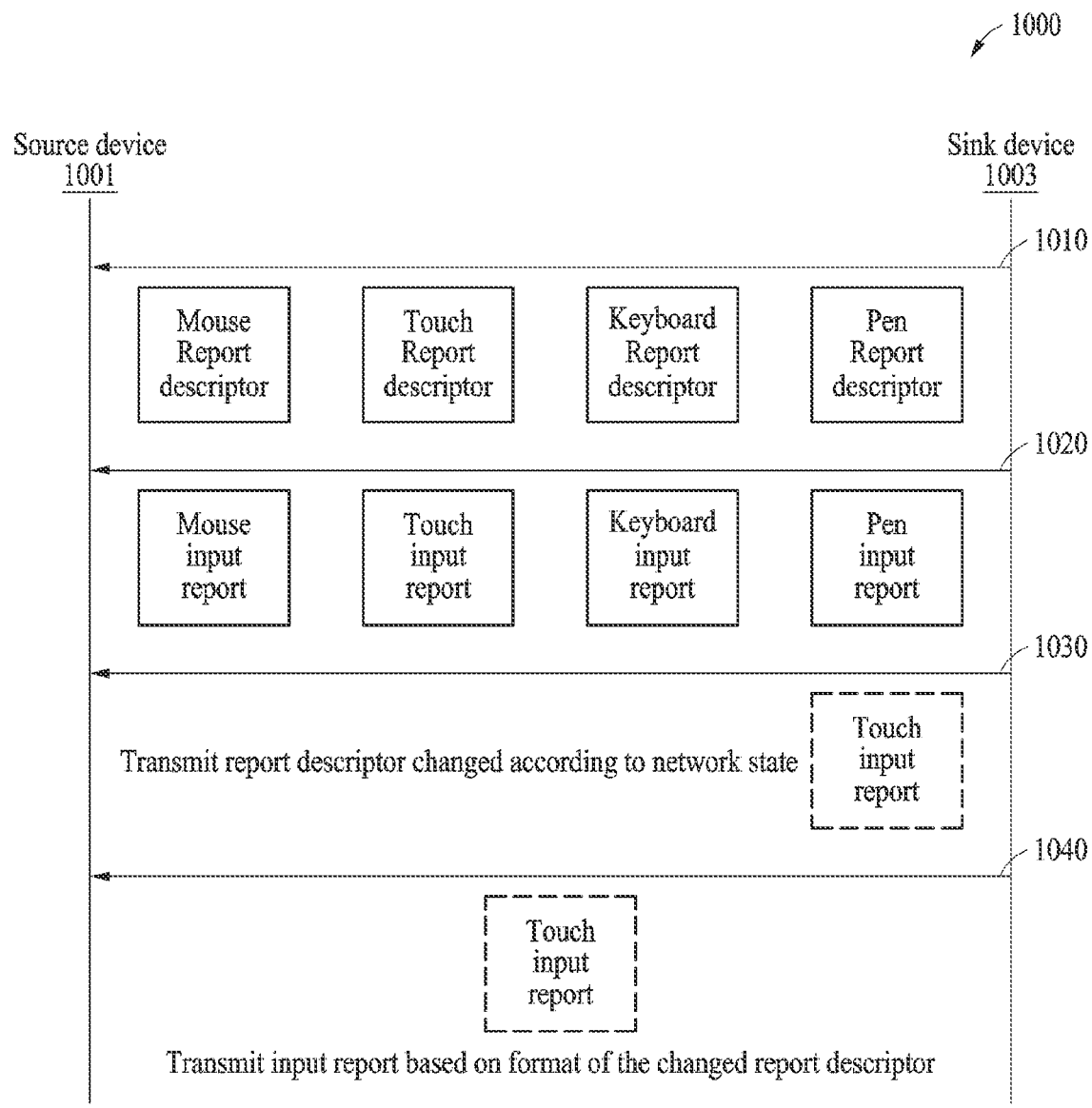
FIG. 10 is a diagram illustrating a method of exchanging an input report and a report descriptor between a source device and a sink device according to one embodiment.
Figure 15:
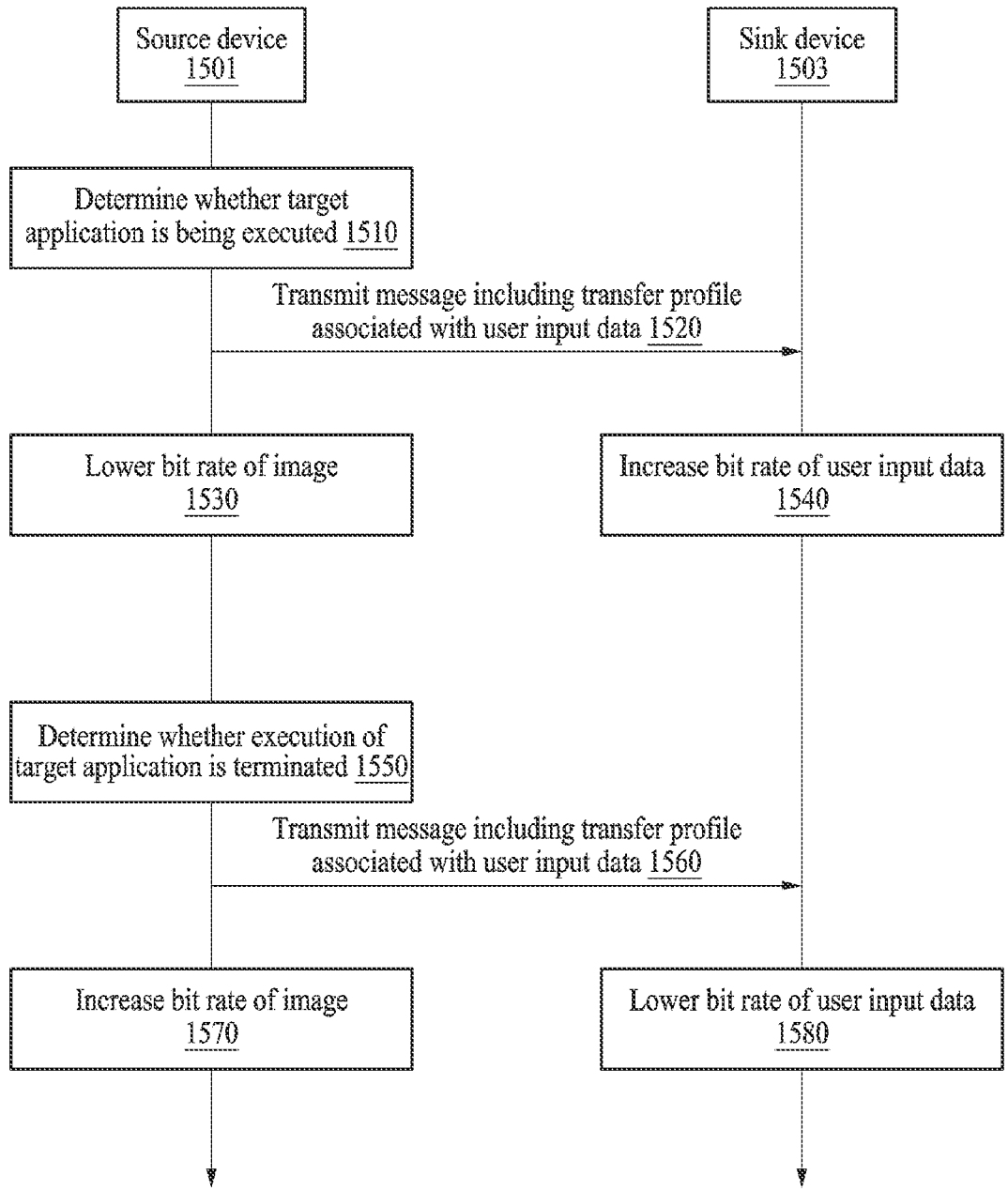
FIG. 15 is a flowchart illustrating a method of adjusting a bit rate of data transmitted through a communication between a source device and a sink device according to one embodiment.

5) of a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16).

In this example, if a relatively low network quality is measured by the sink device 400, the sink device 400 may determine the transfer profile as the third transfer profile based on the relatively low network quality. The sink device 400 may dynamically change a parameter for adaptively adjusting a transmission amount of user input data, based on the third transfer profile.

For example, when a difference between first user input data generated at a current time in the screen image 537 and second user input data generated at a previous time preceding the current time is less than a predetermined value, the sink device 400 may reduce a number of pieces of user input data to be generated, by dropping the first user input data generated at the current time based on the transfer profile.

For example, the sink device 400 may calculate a first difference between first coordinates of the first user input data generated at the current time in the screen image 537 and second coordinates of the second user input data generated at the previous time preceding the current time, for each of the user input data input1, input2, input3, input4, and input5 shown in the diagram 810. For example, when a first difference between three pieces of user input data, e.g., the user input data input2, input3, and input4, is less than a set first reference value, the sink device 400 may adjust a number of pieces of user input data to be transmitted, by dropping the user input data input2, input3, and input4, which are first user input data, based on a selected transfer profile (e.g., the third transfer profile), as shown in the diagram 830. The sink device 400 may transmit two pieces of user input data, e.g., input1 and input5, to a source device (e.g., the electronic devices 101 and 102 of FIG. 1, the source device 300 of FIG. 3, the source device 510 of FIG. 5, the source device 1001 of FIG. 10, the source device 1501 of FIG. 15, and/or the user terminal 1601 of FIG. 16) based on the third transfer profile. In this example, a number of pieces of the first user input data dropped by the sink device 400 may vary depending on a type of transfer profiles.

In another example, the sink device 400 may be configured to drop inputs at a fixed rate, rather than by comparison of the data in the inputs. For example, the second transfer profile may instruct the sink device 400 to drop every other data input, resulting in a fifty percent reduction in the amount of data transmitted. Likewise, the third transfer profile may instruct the sink device 400 to only transmit one out of every four pieces of user input, resulting in a seventy-five percent reduction in the amount of data transmitted.

An amount of user input data generated according to one embodiment may vary depending on a type of an input device used by a user, for example, a type of a user input.

In an example, in a touch input, it may be determined that a new input event occurs every time x and y coordinate values change, and that a new input event does not occur if the x and y coordinate values remain unchanged. In another example, in a pen input, it may be determined that a new input event occurs if a data value, such as a pen pressure and/or a tilt, is changed even though a pen input points to exactly the same coordinates. In other words, a large amount of input data may be generated in response to the pen input, in comparison to the touch input.

For example, when a pen, as an input device, is connected to the sink device 400, user input data by the pen may generally include data, such as a pressure, a tilt, and an orientation, in addition to x and y coordinate values. Accordingly, it may be desirable to reduce a number of pieces user input data, such as a large amount of data generated by a pen input, and transmit the user input data, when a network condition is not good.

If input data is generated by a change in a tilt and/or a pen pressure in a pen input, the sink device 400 may reduce a number of pieces of user input data generated in the same manner as that described above.

The sink device 400 may calculate a second difference between first input information and second input information. The first input information may include at least one of a first pressure, a first tilt, or a first orientation of the first user input data generated at the current time in the screen image 537, and the second input information may include at least one of a second pressure, a second tilt, or a second orientation of the second user input data generated at the previous time preceding the current time.

In an example, when the second difference is less than a set second reference value, the sink device 400 may adjust a number of pieces of user input data to be transmitted, by dropping the first user input data, based on a selected transfer profile. According to a transfer profile, the sink device 400 may limit a number of pieces of user input data to be transmitted, similarly to a second transfer profile, or may set a minimum data size and a minimum number of pieces of user input data to be transmitted, similarly to the third transfer profile.

In another example, when the second difference is greater than or equal to the set second reference value, corresponding user input data may be determined to be meaningful data, and accordingly the sink device 400 may transmit the first user input data to the source device 300 without a change, instead of dropping the first user input data.

The sink device 400 may reduce a number of pieces of user input data to be generated and define a maximum number of pieces of data to be transmitted per second for each profile, by the above method described with reference to FIG. 8.

The sink device 400 may adjust the number of pieces of user input data to be transmitted based on a transfer profile, for each type of user input data.

If the transfer profile is the first transfer profile, the sink device 400 may transmit all user input data generated by a user input to the source device 300. For example, a maximum number of pieces of user input data generated per predetermined time unit (e.g., one second (sec)) may vary depending on a type of each user input data. If the transfer profile is the second transfer profile, the sink device 400 may limit a number of pieces of user input data to be generated such that the maximum number of pieces of user input data for each type of user input data may be limited to about 50% of that of the first transfer profile.

If the transfer profile is the third transfer profile, the sink device 400 may transmit a minimum number of pieces of user input data to the source device 300 in which a malfunction does not occur, for each type of user input data. For example, when the type of user input data is a touch input, if an input event, such as a touch down input and/or a touch up input, is omitted, a remarkable malfunction may occur. However, if a movement amount of an input event, such as a touch move input, is not large, a remarkable malfunction may not occur even though the input event is omitted. The sink device 400 may set a predetermined reference value for an input event that may be omitted based on a movement amount, such as a touch move input, and may reduce an amount of user input data to be generated and an amount of user input data to be transmitted, by dropping an input event that does not exceed the predetermined reference value.

FIG. 9 is a diagram illustrating an example of an input report according to one embodiment. FIG. 9 illustrates an example of an input report 900 of user input data according to one embodiment.

For example, user input data generated in various input devices connected to a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16) may be transmitted. In this example, a portion of the user input data may need to be transmitted in a format (e.g., an HID format) suitable for each type of input devices, or a portion of the user input data may be transmitted in a general format (e.g., a generic format). For example, when a touch input occurs on a screen of the sink device 400, a number of fingers and x and y coordinate values may need to be transmitted as user input data. When a pen input occurs, x and y coordinate values, and information such as a pressure, a tilt, and an orientation may need to be transmitted. In this example, user input data such as the number of fingers and x and y coordinate values, and/or user input data such as the x and y coordinate values, the pressure, the tilt, and/or the orientation may be transmitted in an HID format.

Figure 11:
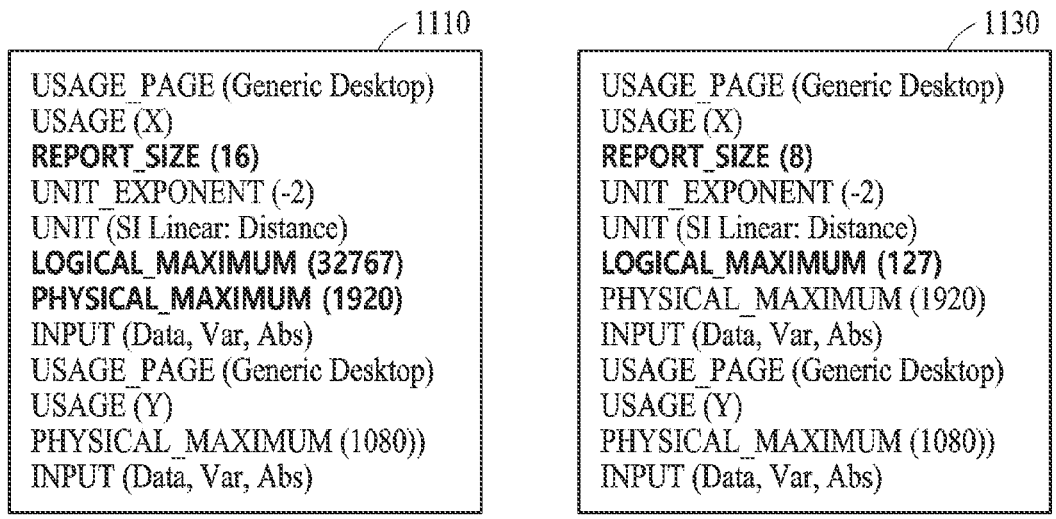
FIG. 11 is a diagram illustrating a report descriptor changed for each transfer profile in response to a touch input according to one embodiment.
Figure 12:
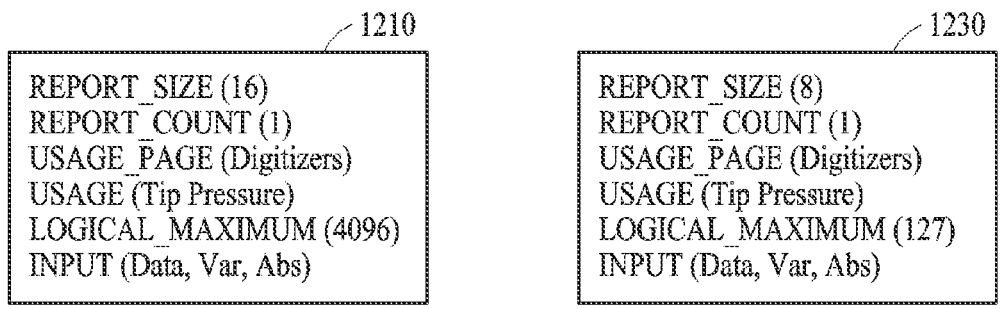
FIG. 12 is a diagram illustrating a report descriptor changed for each transfer profile in response to a pen input according to one embodiment.

If the user input data is transmitted in the HID format, the user input data may include the input report 900 and/or a report descriptor (e.g., the report descriptors 1110 and 1130 of FIG. 11, and/or the report descriptors 1210 and 1230 of FIG. 12).

As shown in FIG. 9, the input report 900 may include content of user input data, for example, actual data such as x and y coordinate values associated with a user input. Here, the x and y coordinate values may be relative coordinate values.

The input report 900 may include, for example, a relative coordinate value corresponding to each of a first transfer profile, a second transfer profile, and a third transfer profile, a value obtained by converting a relative coordinate value into a hexadecimal (hex) number, and byte-align information, but is not limited thereto. The byte-align information may indicate a total number of bytes representing x and y coordinate values.

The report descriptor 1110 may correspond to data indicating a composition of the input report 900 (e.g., a composition such as a size of input data and a transmission order) used to interpret a value of the input report 900. The report descriptor 1110 may be transmitted prior to a transmission of the input report 900, as shown in FIG. 10 below.

If data transmitted in the HID format is received, a source device (e.g., the electronic devices 101 and 102 of FIG. 1, the source device 300 of FIG. 3, the source device 510 of FIG. 5, the source device 1001 of FIG. 10, the source device 1501 of FIG. 15, and/or the user terminal 1601 of FIG. 16) may store the report descriptor 1110 and interpret a value of the input report 900 that is to be received, based on the report descriptor 1110.

FIG. 10 is a diagram illustrating a method of exchanging an input report and a report descriptor of user input data between a source device and a sink device according to one embodiment. FIG. 10 illustrates a diagram 1000 of a situation in which an input report (e.g., the input report 900 of FIG. 9) and a report descriptor (e.g., the report descriptors 1110 and 1130 of FIG. 11, and/or the report descriptors 1210 and 1230 of FIG. 12) corresponding to each user input data are exchanged between a source device 1001 (e.g., the electronic devices 101 and 102 of FIG. 1, the source device 300 of FIG. 3, the source device 510 of FIG. 5, the source device 1501 of FIG. 15, and/or the user terminal 1601 of FIG. 16) and a sink device 1003 (e.g., the electronic devices 101 and 102 of FIG. 1, the sink device 400 of FIG. 4, the sink device 530 of FIG. 5, the sink device 1503 of FIG. 15, and/or the smart glasses 1603 of FIG. 16) through operations 1010 to 1040, when various types of user input data (e.g., a mouse input, a touch input, a keyboard input, and a pen input) according to one embodiment are generated.

The sink device 1003 may transmit user input data including the input report 900 and the report descriptor 1110 for each type of user input data generated in various input devices to the source device 1001.

In operation 1010, the sink device 1003 may transmit a report descriptor corresponding to each of a mouse input, a touch input, a keyboard input, and a pen input to the source device 1001. The source device 1001 may store the report descriptor transmitted in operation 1010.

In operation 1020, the sink device 1003 may transmit an input report corresponding to the report descriptor transmitted in operation 1010, for example, an input report corresponding to each of the mouse input, the touch input, the keyboard input, and the pen input, to the source device 1001. The source device 1001 may interpret the input report corresponding to each of the mouse input, the touch input, the keyboard input, and the pen input, using each report descriptor stored in operation 1010.

An HID such as a keyboard or a mouse may not transmit and receive a new report descriptor, unless specially a new setting is added, after transmitting a first report descriptor. However, if a transfer profile is changed due to a network condition and/or user settings, the sink device 1003 may variably generate a report descriptor of user input data during a mirroring connection and adjust a data size of the user input data.

For example, if a network quality is changed, the sink device 1003 may change the transfer profile in response to the change in the network quality. If the transfer profile is changed, the sink device 1003 may adjust a data size of user input data included in the report descriptor, based on at least one of the changed transfer profile or a type of user input data.

For example, to represent x and y coordinates, the sink device 1003 may change a size of data (e.g., x and y coordinates) by a transfer profile based on a current network condition.

In an example, when the transfer profile is a first transfer profile (e.g., the first transfer profile 610 of FIG. 6), the sink device 1003 may express each of x and y coordinate data as 16 bits, so that x and y coordinates may be represented by 4 bytes in total. In another example, when the transfer profile is a second transfer profile (e.g., the second transfer profile 630 of FIG. 6), the sink device 1003 may express each of x and y coordinate data as 12 bits, so that x and y coordinates may be represented by 3 bytes in total. In another example, when the transfer profile is a third transfer profile (e.g., the third transfer profile 650 of FIG. 6), the sink device 1003 may express each of x and y coordinate data as 8 bits, so that x and y coordinates may be represented by "2" bytes in total.

As described above, if a data size corresponding to a touch input is adjusted based on the transfer profile changed according to the network quality, the sink device 1003 may transmit a changed report descriptor corresponding to the touch input to the source device 1001 in operation 1030. A method by which the sink device 1003 changes a report descriptor for each of transfer profiles (e.g., the first through third transfer profiles 610 through 650 of FIG. 6) will be described in more detail with reference to FIGS. 11 to 12 below.

In operation 1040, the sink device 1003 may transmit an input report changed based on a format of the changed report descriptor.

FIG. 11 is a diagram illustrating a report descriptor changed for each transfer profile in response to a touch input according to one embodiment. FIG. 11 illustrates an example of the report descriptor 1110 in a first transfer profile (e.g., the first transfer profile 610 of FIG. 6) associated with x and y coordinates of a touch input, and an example of the report descriptor 1130 in a third transfer profile (e.g., the third transfer profile 650 in FIG. 6), according to one embodiment.

In an example, when a transfer profile is the first transfer profile, a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16) may express actual x and y coordinates corresponding to a portion of the report descriptor 1110 associated with the x and y coordinates of the touch input as relative values between "0" and "32767." The sink device 400 may express data representing the x and y coordinates of the touch input in the report descriptor 1110 using all 16 bits, as in "REPORT_SIZE (16)", and transmit the data so that original data (e.g., x and y coordinates) may not be lost. In addition, "LOGICAL_MAXIMUM (32767)" described in the report descriptor 1110 may indicate that a transmission of data may be expressed by relative values between "0" and "32767", and "PHYSICAL_MAXIMUM (1920)" may indicate that a physical value corresponding to a relative value ranges from "0" to "1920."

In another example, when the transfer profile is the third transfer profile, the sink device 400 may express actual x and y coordinates corresponding to a portion of the report descriptor 1130 associated with the x and y coordinates of the touch input as relative values between "0" and "127." The sink device may express data representing the x and y coordinates of the touch input in the report descriptor 1130, using 8 bits as in "REPORT_SIZE (8)." In this example, the sink device 400 may express 16-bit data (e.g., x and y coordinates) as 8-bit data by downscaling the data. If the downscaled data is transmitted to the source device 300 and restored, the x and y coordinate values may be different from the original values. Here, "PHYSICAL_MAXIMUM (1920)" described in the report descriptor 1130 may indicate that a physical maximum value corresponding to a relative value ranges from "0" to "1920." According to one embodiment, since the source device 300 generates screen image data, a maximum value of actual x and y coordinates may be stored in advance in the source device 300. Here, a value of PHYSICAL_MAXIMUM may not be included in the report descriptor 1130. "LOGICAL_MAXIMUM (127)" may indicate that data having a physical maximum value of "0" to "1920" is downscaled to a value between "0" and "127" and transmitted. As described above, based on information included in the report descriptor 1130, the source device 300 may interpret 64-bit data transmitted by the sink device 400 as 960-bit data, or interpret 127-bit data transmitted by the sink device 400 as 1920-bit data.

The sink device 400 may reduce a size of data by downscaling a pen pressure value of a pen input in the same manner as that of the x and y coordinate values of the touch input. A method of changing a size of data for a pen pressure value of a pen input will be described in more detail with reference to FIG. 12 below.

FIG. 12 is a diagram illustrating a report descriptor changed for each transfer profile in response to a pen input according to one embodiment. FIG. 12 illustrates a diagram 1210 showing a portion of a report descriptor in a first transfer profile (e.g., the first transfer profile 610 of FIG. 6) associated with a pen pressure value of a pen input according to one embodiment, and a diagram 1230 showing a portion of a report descriptor in a third transfer profile (e.g., the third transfer profile 650 in FIG. 6).

In an example, when a transfer profile is the first transfer profile, a sink device (e.g., the electronic devices 101 and 102 of FIG. 1, the sink device 400 of FIG. 4, the sink device 530 of FIG. 5, sink device 1003 of FIG. 10, the sink device 1503 of FIG. 15, and/or the smart glasses 1603 of FIG. 16) may express a value indicating the pen pressure of the pen input as 16 bits, as in "REPORT_SIZE (16)" described in the report descriptor 1210 associated with the pen pressure of the pen input. In addition, "LOGICAL_MAXIMUM (4096)" described in the report descriptor 1210 may indicate that a transmission of data on the pen pressure may be expressed by relative values between "0" and "4096".

In another example, when the transfer profile is the third transfer profile, the sink device 400 may downscale the value indicating the pen pressure of the pen input which is expressed as 16 bits to 8 bits. The sink device 400 may express the value indicating the pen pressure of the pen input as 8 bits, as in "REPORT_SIZE (8)" described in the report descriptor 1230 associated with the pen pressure of the pen input. "LOGICAL_MAXIMUM (127)" described in the report descriptor 1230 may indicate that a transmission of data on the pen pressure may be expressed by relative values between "0" and "127".

Figure 13:
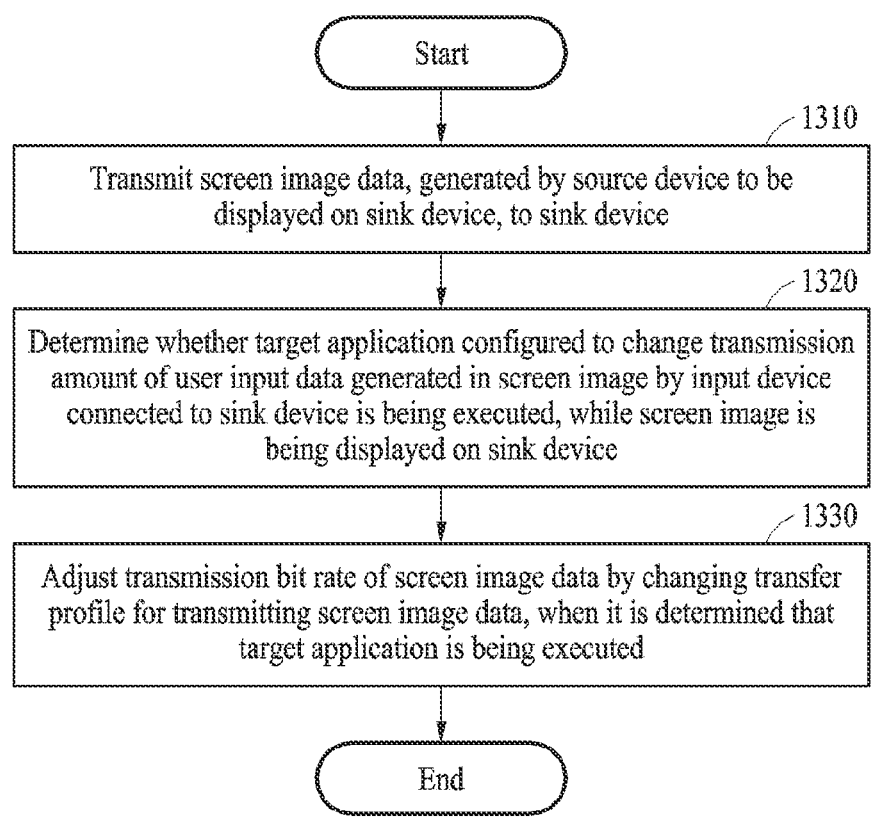
FIG. 13 is a flowchart illustrating a method of operating a source device according to one embodiment.

FIG. 13 is a flowchart illustrating a method of operating a source device according to one embodiment. In the following embodiments, operations may be performed sequentially, but need not necessarily be performed sequentially. For example, the order of the operations may be changed and at least two of the operations may be performed in parallel. Referring to FIG. 13, a source device (e.g., the electronic devices 101 and 102 of FIG. 1, the source device 300 of FIG. 3, the source device 510 of FIG. 5, the source device 1001 of FIG. 10, the electronic device 1501 of FIG. 15, and/or the user terminal 1601 of FIG. 16) according to one embodiment may adjust a transmission bit rate of a screen through operations 1310 to 1330.

In operation 1310, the source device 300 may transmit screen image data, generated by the source device 300 to be displayed on a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16), to the sink device 400.

In operation 1320, the source device 300 may determine whether a target application configured to change a transmission amount of user input data generated in a screen image (e.g., the screen image 537 of FIG. 5) that is based on the screen image data by an input device connected to the sink device 400 is being executed, while the screen image 537 is being displayed on the sink device 400 through operation 1310.

In operation 1330, when it is determined that the target application is being executed in operation 1320, the source device 300 may adjust a transmission bit rate of the screen image data by changing a transfer profile for transmitting the screen image data.

Figure 14:
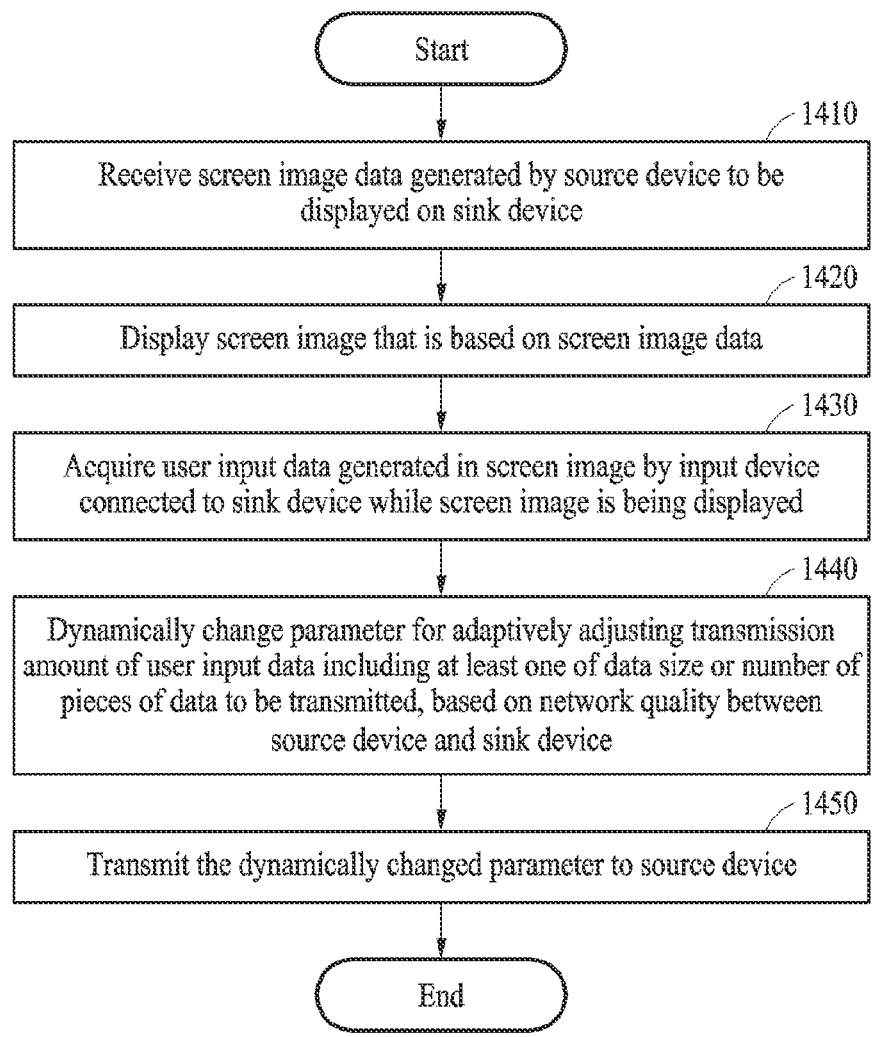
FIG. 14 is a flowchart illustrating a method of operating a sink device according to one embodiment.

FIG. 14 is a flowchart illustrating a method of operating a sink device according to one embodiment. In the following embodiments, operations may be performed sequentially, but need not necessarily be performed sequentially. For example, the order of the operations may be changed and at least two of the operations may be performed in parallel.

Referring to FIG. 14, a sink device (e.g., the electronic devices 101 and 102 of FIG. 1, the sink device 400 of FIG. 4, the sink device 530 of FIG. 5, the sink device 1003 of FIG. 10, the sink device 1503 of FIG. 15, and/or the smart glasses 1603 of FIG. 16) may transmit a parameter that is dynamically changed to adjust a transmission amount of user input data to a source device (e.g., the electronic devices 101 and 102 of FIG. 1, the source device 300 of FIG. 3, the source device 510 of FIG. 5, the source device 1001 of FIG. 10, the electronic device 1501 of FIG. 15, and/or the user terminal 1601 of FIG. 16) through operations 1410 to 1450.

In operation 1410, the sink device 400 may receive screen image data generated by the source device 300 to be displayed on the sink device 400.

In operation 1420, the sink device 400 may display a screen image (e.g., the screen image 537 of FIG. 5) that is based on the screen image data received in operation 1410.

In operation 1430, the sink device 400 may acquire user input data, generated in the screen image 537 by an input device (e.g., the input device 531 of FIG. 5) connected to the sink device 400, while the screen image 537 is being displayed in operation 1420.

In operation 1440, the sink device 400 may dynamically change a parameter for adaptively adjusting a transmission amount of user input data including at least one of a data size or a number of pieces of data to be transmitted, based on a network quality between the source device 300 and the sink device 400.

In operation 1450, the sink device 400 may transmit the parameter dynamically changed in operation 1440 to the source device 300.

FIG. 15 is a flowchart illustrating a method of adjusting a bit rate of data transmitted through a communication between a source device and a sink device according to one embodiment. In the following embodiments, operations may be performed sequentially, but need not necessarily be performed sequentially. For example, the order of the operations may be changed and at least two of the operations may be performed in parallel.

Referring to FIG. 15, the source device 1501 (e.g., the electronic devices 101 and 102 of FIG. 1, the source device 300 of FIG. 3, the source device 510 of FIG. 5, the source device 1001 of FIG. 10, and/or the user terminal 1601 of FIG. 16) according to one embodiment, and the sink device 1503 (e.g., the electronic devices 101 and 102 of FIG. 1, the sink device 400 of FIG. 4, the sink device 530 of FIG. 5, the sink device 1003 of FIG. 10, and/or the smart glasses 1603 of FIG. 16) may adaptively adjust a bit rate of an image and a bit rate of user input data through operations 1510 to 1580.

In operation 1510, the source device 1501 may determine or confirm whether a target application is being executed on an image displayed by the source device 1501. Here, the target application may correspond to an application configured to change a transmission amount of user input data by an input device (e.g., the input device 531 of FIG. 5) connected to the sink device 1503, because a relatively large amount of user input data is generated in the target application in comparison to other applications. The target application may include, for example, a handwriting app, a photo editing app, and a drawing app, in which at least one of a pen input event or a touch input event occurs, but is not limited thereto.

When it is determined that the target application is being executed in operation 1510, the source device 1501 may transmit a message including a transfer profile associated with user input data to the sink device 1503, to share a current network condition with the sink device 1503 in operation 1520. The message transmitted by the source device 1501 in operation 1520 may be, for example, an RTSP message. The RTSP message may be a network control protocol for controlling a streaming media server and may operate in an application layer of an Internet protocol. The RTSP message may include information on an information transmission scheme of voice or video transmitted in real time, such as a transfer profile. The RTSP message may include a parameter such as "wfd_UIBC_first=on." The message transmitted by the source device 1501 in operation 1520 may include, for example, a signal to request the sink device 1503 to increase a transmission amount of user input data.

Operation 1520 may be performed in a background such that a user may fail to recognize, or a message in which a transmission amount of user input data is set to a value desired by a user by allowing the user to directly select the value may be transmitted.

In operation 1530, the source device 1501 may lower a bit rate of screen image data, based on the transfer profile included in the message transmitted in operation 1520. The screen image data may correspond to screen image data generated by the source device 1501 to be displayed on the sink device 1503. If the message is transmitted in operation 1520, the source device 1501 may lower a bit rate of a previously transmitted image, to secure a band in which a larger amount of user input data may be transmitted within a limited network throughput. For example, in a drawing app, due to a relatively low complexity of an image, a currently displayed image may not be significantly different from a previously displayed image even though a bit rate of the image is lowered.

In operation 1540, the sink device 1503 may increase a bit rate of user input data (e.g., UIBC data) based on a transfer profile included in the message received in operation 1520. The sink device 1503 may enhance a quality of user input data by increasing the transfer profile or transmitting the user input data without a limitation in the same manner as the above-described method.

In one embodiment, operations 1530 and 1540 may be performed concurrently or sequentially with a predetermined time difference.

In operation 1550, the sink device 1503 may determine or confirm whether execution of the target application determined in operation 1510 is terminated.

When it is determined in operation 1550 that the execution of the target application is terminated, the source device 1501 may transmit a message including a transfer profile related to user input data to the sink device 1503 in operation 1560. The transfer profile included in the message transmitted by the source device 1501 in operation 1560 may include, for example, information to request the sink device 1503 to lower a transmission amount of user input data.

In operation 1570, the source device 1501 may increase a bit rate of the image based on the transfer profile included in the message transmitted in operation 1560.

In operation 1580, the sink device 1503 may lower the bit rate of the user input data again based on the transfer profile included in the message received in operation 1560.

FIG. 16 is a diagram illustrating a process of transmitting user input data when a source device and a sink device are a user terminal and smart glasses, respectively, according to one embodiment.

FIG. 16 illustrates an operation of transmitting and receiving user input data between the user terminal 1601 corresponding to a source device (e.g., the electronic devices 101 and 102 of FIG. 1, the source device 300 of FIG. 3, the source device 510 of FIG. 5, the source device 1001 of FIG. 10, and/or the source device 1501 of FIG. 15) according to one embodiment, and the smart glasses 1603 corresponding to a sink device (e.g., the electronic devices 101 and 102 of FIG. 1, the sink device 400 of FIG. 4, the sink device 530 of FIG. 5, the sink device 1003 of FIG. 10, and/or the sink device 1503 of FIG. 15). The smart glasses 1603 may be, for example, augmented reality (AR) glasses, but is not limited thereto.

The method of transmitting user input data described above with reference to FIGS. 3 to 15 may equally apply to AR devices, for example, a head-mounted display (HMD) or the smart glasses 1603, in addition to Miracast.

For example, in AR devices, user input data, for example, a gesture such as a user's hand motion, or a user's gaze, may be generated on a screen in which virtual content and a real screen are mixed.

In one embodiment, the above-described method of transmitting user input data is not limited to a UIBC interface and may equally apply to various types of user input data generated in AR devices, thereby enhancing usability.

If the sink device is the smart glasses 1603, user input data may be extended to an interface that includes a variety of additional information (e.g., image information and depth information for eye, head and hand tracking information, gesture recognition, object recognition, and/or object tracking) that is not defined by a general UIBC protocol. Therefore, an interface protocol for transmitting a variety of additional information may be newly defined, and a format of metadata for sharing and/or transmitting a variation in additional information or a relationship between additional information as well as raw data including compressed data may also be defined.

In one embodiment, for a transmission of user input data generated in AR devices, an interface for sharing a variety of additional information, used instead of a UIBC interface protocol, may be defined as a "user input interface."

A synchronization process including a transmission of user input data between the user terminal 1601 corresponding to the source device and the smart glasses 1603 corresponding to the sink device may be performed through, for example, operations 1610 to 1680.

In operation 1610, the user terminal 1601 may be connected to the smart glasses 1603 through tethering.

If a connection to the smart glasses 1603 is established through tethering, the user terminal 1601 may request the smart glasses 1603 to perform capability checking in operation 1620.

If a request to perform capability checking is received, the smart glasses 1603 may transmit information, for example, a transfer protocol, a type and a form of data to be shared with the user terminal 1601 and/or data to be transmitted to the user terminal 1601, to the user terminal 1601 through a user input interface in operation 1630.

In operation 1640, the smart glasses 1603 may share a variation and/or display information about a real screen displayed on the smart glasses 1603 and/or a virtual screen including virtual content with the user terminal 1601 in real time. The display information may include, for example, at least one of a number of virtual screens (e.g., screen images) including virtual content, a size of a virtual screen, a resolution of a virtual screen, a bit rate of a virtual screen, or a size, a resolution or a bit rate of the real screen, but is not limited thereto.

In operation 1650, the user terminal 1601 may send, to the smart glasses 1603, a request to transmit user input data based on the display information shared in operation 1640 using the user input interface. The user terminal 1601 may request the smart glasses 1603 to transmit user input data based on one profile determined among one or more preset profiles. For example, when there are multiple types of user input data, profiles having different transmission bit rates may be defined according to each of the types of user input data. In this example, the user terminal 1601 may request the smart glasses 1603 to transmit user input data according to the profiles having the different transmission bit rates for each of the types of user input data. In operation 1660, the smart glasses 1603 may transmit user input data generated by the smart glasses 1603 to the user terminal 1601, in response to the request in operation 1650.

In operation 1670, the smart glasses 1603 may determine whether a display information change event occurs by a program or an app (e.g., a real estate app or a game app) installed in the smart glasses 1603.

If it is determined that the display information change event occurs in operation 1670, the smart glasses 1603 may change a transfer profile using the user input interface in operation 1680.

In operation 1690, the smart glasses 1603 may transmit information including the user input data based on the transfer profile changed in operation 1680 to the user terminal 1601, so that the smart glasses 1603 may be synchronized with the user terminal 1601.

The synchronization process between the user terminal 1601 and the smart glasses 1603 described above with reference to FIG. 16 may also be performed in a manner in which one or more devices, such as a server/a client, a master device/a slave device, and/or multi-access edge computing (MEC) cloud/pico cloud, distribute and process processing.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. Therefore, other implementations, other embodiments, and equivalents to the claims are also within the scope of the following claims.

According to one embodiment, the source device 101, 102, 300, 510, 1001, 1501, and/or 1601 includes a wireless communication module 192, 310, a memory 130, 330, and a processor 120, 340. The processor 120, 340 may be configured to transmit screen image data, generated by the source device 101, 102, 300, 510, 1001, 1501, and/or 1601 to be displayed on a sink device 101, 102, 400, 530, 1003, 1503, and/or 1603, to the sink device 101, 102, 400, 530, 1003, 1503, and/or 1603 through the wireless communication module 192, 310, determine whether a target application configured to change a transmission amount of user input data generated in a screen image 537 that is based on the screen image data, by an input device 531 connected to the sink device 101, 102, 400, 530, 1003, 1503, and/or 1603 is being executed while the screen image 537 is being displayed on the sink device 101, 102, 400, 530, 1003, 1503, and/or 1603, and adjust a transmission bit rate of the screen image data by changing a transfer profile for transmitting the screen image data, when it is determined that the target application is being executed.

According to one embodiment, the screen image data may include at least one of an image frame generated by duplicating a screen 515 displayed by a display module 160, 320 of the source device 101, 102, 300, 510, 1001, 1501, and/or 1601 or an image frame related to the screen 515 displayed by the display module 160, 320 of the source device 101, 102, 300, 510, 1001, 1501, and/or 1601.

According to one embodiment, the processor 120, 340 may be configured to, when it is determined that the target application is being executed, transmit a message including the transfer profile associated with the user input data to the sink device 101, 102, 400, 530, 1003, 1503, and/or 1603.

According to one embodiment, the processor 120, 340 may be configured to, when it is determined that the target application is being executed, request the sink device 101, 102, 400, 530, 1003, 1503, and/or 1603 to increase the transmission amount of the user input data based on the transfer profile.

According to one embodiment, the target application may include at least one of a handwriting app, a photo editing app, or a drawing app in which at least one of a pen input event or a touch input event occurs.

According to one embodiment, when the sink device 101, 102, 400, 530, 1003, 1503, 1603 is smart glasses 1603, the processors 120, 340 may be configured to receive display information including at least one of a number of screen images displayed on the smart glasses 1603, a size of each of the screen images, a resolution of each of the screen images, or a bit rate of each of the screen images, through the wireless communication module 192, 310, and request the smart glasses 1603 to transmit information through a user input interface for sharing additional information, based on the display information.

According to one embodiment, a sink device 101, 102, 400, 530, 1003, 1503, and/or 1603 includes a wireless communication module 192, 410, a display module 160, 320, a memory 130, 430, and a processor 120, 440. The processor 120, 440 may be configured to receive screen image data, generated by a source device 101, 102, 300, 510, 1001, 1501, and/or 1601 to be displayed on the sink device 101, 102, 400, 530, 1003, 1503, and/or 1603, through the wireless communication module 192, 410, display a screen image 537 that is based on the screen image data, using the display module 160, 320, acquire user input data, generated in the screen image 537 by an input device 531 connected to the sink device 101, 102, 400, 530, 1003, 1503, and/or 1603, while the screen image 537 is being displayed, dynamically change a parameter for adaptively adjusting a transmission amount of the user input data including at least one of a data size or a number of pieces of data to be transmitted, based on a network quality between the source device 101, 102, 300, 510, 1001, 1501, and/or 1601 and the sink device 101, 102, 400, 530, 1003, 1503, and/or 1603, and transmit the dynamically changed parameter to the source device 101, 102, 300, 510, 1001, 1501, and/or 1601.

According to one embodiment, the screen image data may include at least one of an image frame generated by duplicating a screen 515 displayed by a display module 160, 320 of the source device 101, 102, 300, 510, 1001, 1501, and/or 1601 or an image frame related to the screen 515 displayed by the display module 160, 320 of the source device 101, 102, 300, 510, 1001, 1501, and/or 1601.

According to one embodiment, the processor 120, 440 may be configured to measure the network quality between the source device 101, 102, 300, 510, 1001, 1501, and/or

1601 and the sink device 101, 102, 400, 530, 1003, 1503, and/or 1603, determine one of a plurality of transfer profiles 610, 630, and 650 used for a transmission of the user input data, based on the network quality, and adaptively adjust the parameter based on the transfer profile.

According to one embodiment, the plurality of transfer profiles 610, 630, and 650 may include at least two of a first transfer profile 610 corresponding to a first network quality, a second transfer profile 630 corresponding to a second network quality less than the first network quality, and a third transfer profile 650 corresponding to a third network quality less than the second network quality. Each of the transfer profiles 610, 630, and 650 may include a transmission amount for each of the transfer profiles 610, 630, and 650. The transmission amount for each of the transfer profiles 610, 630, and 650 may include at least one of a maximum size or a maximum number of pieces of the user input data to be transmitted at once for each of the transfer profiles 610, 630, and 650.

According to one embodiment, the first transfer profile 610 may have a first transmission amount corresponding to the maximum size and the maximum number of pieces of the user input data that are unlimited. The second transfer profile 630 may have a second transmission amount that is less than the first transmission amount through downscaling or dropping of the user input data. The third transfer profile 650 may have a third transmission amount, and a size and a number of pieces of the user input data corresponding to the third transmission amount may be less than those corresponding to the second transmission amount.

According to one embodiment, the processor 120, 440 may be configured to calculate a first difference between first coordinates of first user input data generated at a current time and second coordinates of second user input data generated at a previous time preceding the current time in the screen image 537, and adjust a number of pieces of the user input data to be transmitted, by dropping the first user input data based on the transfer profile, when the first difference is less than a set first reference value.

According to one embodiment, the processor 120, 440 may be configured to calculate a second difference between first input information and second input information, and adjust a number of pieces of the user input data to be transmitted, by dropping the first user input data based on the transfer profile, when the second difference is less than a set second reference value. The first input information may include at least one of a first pressure, a first tilt, or a first orientation of first user input data generated at a current time in the screen image 537, and the second input information may include at least one of a second pressure, a second tilt, or a second orientation of second user input data generated at a previous time preceding the current time.

According to one embodiment, the processor 120, 440 may be configured to adjust a number of pieces of the user input data to be transmitted, based on the transfer profile for each type of the user input data.

According to one embodiment, the user input data may include at least one of an input report 900 indicating content of the user input data, and a report descriptor 1110, 1130, 1210, 1230 that is transmitted prior to a transmission of the input report 900 and that indicates a composition of the input report 900 used to interpret a value of the input report 900. The processor 120, 440 may be configured to, when the transfer profile is changed in response to a change in the network quality, adjust a data size of the user input data included in the report descriptor 1110, 1130, 1210, 1230, based on at least one of the changed transfer profile or a type of the user input data.

According to one embodiment, the processor 120, 440 may be configured to determine the network quality between the source device 101, 102, 300, 510, 1001, 1501, and/or 1601 and the sink device 101, 102, 400, 530, 1003, 1503, and/or 1603 based on at least one of a TCP window size or an RTT between the source device 101, 102, 300, 510, 1001, 1501, and/or 1601 and the sink device 101, 102, 400, 530, 1003, 1503, and/or 1603.

According to one embodiment, the processor 120, 440 may be configured to, when the sink device 101, 102, 400, 530, 1003, 1503, and/or 1603 is smart glasses 1603, share display information including at least one of a number of screen images displayed on the smart glasses 1603, a size of each of the screen images, a resolution of each of the screen images, or a bit rate of each of the screen images, with the source device 101, 102, 300, 510, 1001, 1501, and/or 1601, and receive a request for a transmission of information from the source device 101, 102, 300, 510, 1001, 1501, and/or 1601 through a user input interface for sharing additional information.

According to one embodiment, a method of operation of a source device 101, 102, 300, 510, 1001, 1501, and/or 1601 includes operation 1310 of transmitting screen image data, generated by the source device 101, 102, 300, 510, 1001, 1501, and/or 1601 to be displayed on a sink device 101, 102, 400, 530, 1003, 1503, and/or 1603, to the sink device 101, 102, 400, 530, 1003, 1503, and/or 1603, operation 1320 of determining whether a target application configured to change a transmission amount of user input data generated in a screen image 537 that is based on the screen image data, by an input device 531 connected to the sink device 101, 102, 400, 530, 1003, 1503, and/or 1603 is being executed while the screen image 537 is being displayed on the sink device 101, 102, 400, 530, 1003, 1503, and/or 1603, and operation 1330 of adjusting a transmission bit rate of the screen image data by changing a transfer profile for transmitting the screen image data, when it is determined that the target application is being executed.

According to one embodiment, a method of operating a sink device 101, 102, 400, 530, 1003, 1503, and/or 1603 includes operation 1410 of receiving screen image data generated by a source device 101, 102, 300, 510, 1001, 1501, and/or 1601 to be displayed on the sink device 101, 102, 400, 530, 1003, 1503, and/or 1603, operation 1420 of displaying a screen image 537 that is based on the screen image data, operation 1430 of acquiring user input data, generated in the screen image 537 by an input device 531 connected to the sink device 101, 102, 400, 530, 1003, 1503, and/or 1603, while the screen image 537 is being displayed, operation 1440 of dynamically changing a parameter for adaptively adjusting a transmission amount of the user input data including at least one of a data size or a number of pieces of data to be transmitted, based on a network quality between the source device 101, 102, 300, 510, 1001, 1501, and/or 1601 and the sink device 101, 102, 400, 530, 1003, 1503, and/or 1603, and operation 1450 of transmitting the dynamically changed parameter to the source device 101, 102, 300, 510, 1001, 1501, and/or 1601.

According to one embodiment, a method of operating a sink device 101, 102, 400, 530, 1003, 1503, and/or 1603, may be further include: measuring the network quality between the source device 101, 102, 300, 510, 1001, 1501, and/or 1601 and the sink device 101, 102, 400, 530, 1003, 1503, and/or 1603; selecting, based on the network quality, one of a plurality of transfer profiles to be used for transmission of the user input data; and adjusting the parameter based on the one of the plurality of transfer profiles. According to one embodiment, wherein the plurality of transfer profiles comprises a first transfer profile corresponding to a first network quality and a second transfer profile corresponding to a second network quality that is less than the first network quality, and each of the plurality of transfer profiles comprises a transmission amount including at least one of a maximum size and a maximum number of pieces of the user input data to be transmitted at once.

According to one embodiment, wherein the maximum number of pieces of the user input data to be transmitted at once of the second transfer profile is approximately fifty percent of the maximum number of pieces of the user input data to be transmitted at once of the first transfer profile.

What is claimed is:

1. A source device comprising: a wireless communication module; a memory; and a processor, wherein the processor is configured to: transmit screen image data, generated by the source device to be displayed on a sink device, to the sink device through the wireless communication module; determine whether a target application configured to change a transmission amount of user input data generated in a screen image is being executed while the screen image is being displayed on the sink device; and adjust a transmission bit rate of the screen image data by changing a transfer profile for transmitting the screen image data, based on a determination that the target application is being executed, wherein the transmission amount is determined by the target application based on an analysis of an interaction of the screen image data with an input device connected to the sink device, wherein the analysis of the interaction of the screen image data with the input device connected to the sink device includes calculating a first difference between first coordinates of first user input data generated at a current time and second coordinates of second user input data generated at a previous time preceding the current time in the screen image, and wherein the processor is configured to adjust a number of pieces of user input data to be transmitted, by dropping the first user input data based on the transfer profile, when the first difference is less than a set first reference value.

2. The source device of claim 1, wherein the screen image data comprises at least one of an image frame generated by duplicating a screen displayed by a display module of the source device and an image frame related to the screen displayed by the display module of the source device.

3. The source device of claim 1, wherein the processor is further configured to transmit a message including the transfer profile associated with the user input data to the sink device based on a determination that the target application is being executed.

4. The source device of claim 3, wherein the processor is further configured to request the sink device to increase the transmission amount of the user input data based on the transfer profile based on a determination that the target application is being executed.

5. The source device of claim 1, wherein the target application comprises at least one of a handwriting application, a photo editing application, and a drawing application in which at least one of a pen input event and a touch input event occurs.

6. The source device of claim 1, wherein the sink device is smart glasses, and the processor is configured to:
receive display information including at least one of a number of screen images displayed on the smart glasses, a size of each of the screen images, a resolution of each of the screen images, and a bit rate of each of the screen images, through the wireless communication module; and
request the smart glasses to transmit information through a user input interface for sharing additional information, based on the display information.

7. A sink device comprising: a wireless communication module; a display module; a memory; and a processor, wherein the processor is configured to: receive screen image data, generated by a source device to be displayed on the sink device, through the wireless communication module; display a screen image that is based on the screen image data, using the display module; acquire user input data, generated in the screen image by an input device connected to the sink device, while the screen image is being displayed; dynamically change a parameter for adaptively adjusting a transmission amount of the user input data including at least one of a data size and a number of pieces of data to be transmitted from the sink device to the source device, based on a network quality between the source device and the sink device; calculate a first difference between first coordinates of first user input data generated at a current time and second coordinates of second user input data generated at a previous time preceding the current time in the screen image; adjust a number of pieces of user input data to be transmitted, by dropping the first user input data based on the transfer profile, when the first difference is less than a set first reference value; and transmit the dynamically changed parameter to the source device.

8. The sink device of claim 7, wherein the screen image data comprises at least one of an image frame generated by duplicating a screen displayed by a display module of the source device and an image frame related to the screen displayed by the display module of the source device.

9. The sink device of claim 7, wherein the processor is further configured to:
measure the network quality between the source device and the sink device;
determine one of a plurality of transfer profiles used for a transmission of the user input data, based on the network quality; and
adaptively adjust the parameter based on the one of the plurality of transfer profiles.

10. The sink device of claim 9, wherein
the plurality of transfer profiles comprises at least two of a first transfer profile corresponding to a first network quality, a second transfer profile corresponding to a second network quality less than the first network quality, and a third transfer profile corresponding to a third network quality less than the second network quality, and
each of the plurality of transfer profiles comprises a transmission amount for each of the transfer profiles that comprises at least one of a maximum size or a maximum number of pieces of the user input data to be transmitted at once for each of the transfer profiles.

11. The sink device of claim 10, wherein
the first transfer profile has a first transmission amount corresponding to the maximum size and the maximum number of pieces of the user input data that are unlimited,
the second transfer profile has a second transmission amount that is less than the first transmission amount through downscaling or dropping of the user input data, and the third transfer profile has a third transmission amount corresponding to a size and a number of pieces of the user input data that are less than a size and a number of pieces of the user input data corresponding to the second transmission amount.

12. The sink device of claim 9, wherein the processor is further configured to:
calculate a second difference between first input information and second input information, the first input information comprising at least one of a first pressure, a first tilt, or a first orientation of first user input data generated at a current time in the screen image and the second input information comprising at least one of a second pressure, a second tilt, or a second orientation of second user input data generated at a previous time preceding the current time; and
adjust a number of pieces of user input data to be transmitted, by dropping the first user input data based on the transfer profile, when the second difference is less than a set second reference value.

13. The sink device of claim 9, wherein the processor is further configured to adjust a number of pieces of user input data to be transmitted, based on the transfer profile for each type of the user input data.

14. The sink device of claim 9, wherein
the user input data comprises:
an input report indicating content of the user input data; and
a report descriptor that is transmitted prior to a transmission of the input report and that indicates a composition of the input report used to interpret a value of the input report, and
the processor is further configured to, when the transfer profile is changed in response to a change in the network quality, adjust a data size of the user input data included in the report descriptor, based on at least one of the changed transfer profile and a type of the user input data.

15. The sink device of claim 9, wherein the processor is further configured to determine the network quality between the source device and the sink device based on at least one of a transmission control protocol (TCP) window size and a round trip time (RTT) between the source device and the sink device.

16. The sink device of claim 7, wherein the processor is further configured to, based on a determination that the sink device is smart glasses:
share display information including at least one of a number of screen images displayed on the smart glasses, a size of each of the screen images, a resolution of each of the screen images, and a bit rate of each of the screen images, with the source device; and
receive a request for a transmission of information from the source device through a user input interface for sharing additional information.

17. A method of operating a source device, the method comprising: transmitting screen image data, generated by the source device to be displayed on a sink device, to the sink device; determining whether a target application configured to change a transmission amount of user input data generated in a screen image is being executed while the screen image is being displayed on the sink device; and adjusting a transmission bit rate of the screen image data by changing a transfer profile for transmitting the screen image data, based on a determination that the target application is being executed, wherein the transmission amount is determined by the target application based on an analysis of the interaction of the screen image data with an input device connected to the sink, wherein the analysis of the interaction of the screen image data with the input device connected to the sink device includes calculating a first difference between first coordinates of first user input data generated at a current time and second coordinates of second user input data generated at a previous time preceding the current time in the screen image, and wherein the processor is configured to adjust a number of pieces of user input data to be transmitted, by dropping the first user input data based on the transfer profile, when the first difference is less than a set first reference value.

18. A non-transitory computer-readable storage medium storing instructions that, when executed by a processor, cause the processor to perform the method of claim 17.

19. A method of operating a sink device, the method comprising: receiving screen image data generated by a source device to be displayed on the sink device; displaying a screen image that is based on the screen image data; acquiring user input data, generated in the screen image by an input device connected to the sink device, while the screen image is being displayed; dynamically changing a parameter for a transmission of the user input data including at least one of a data size and a number of pieces of data to be transmitted from the sink device to the source device, based on a network quality between the source device and the sink device; calculating a first difference between first coordinates of first user input data generated at a current time and second coordinates of second user input data generated at a previous time preceding the current time in the screen image; adjusting a number of pieces of user input data to be transmitted, by dropping the first user input data based on the transfer profile, when the first difference is less than a set first reference value; and transmitting the dynamically changed parameter to the source device.

* * * * *